(12) United States Patent
Takahashi et al.

(10) Patent No.: US 10,668,916 B2
(45) Date of Patent: *Jun. 2, 2020

(54) CONTROL DEVICE FOR HYBRID VEHICLE

(71) Applicant: TOYOTA JIDOSHA KABUSHIKI KAISHA, Toyota-shi, Aichi-ken (JP)

(72) Inventors: Tomoya Takahashi, Ebina (JP); Mitsuhiro Tabata, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,345

(22) Filed: Aug. 29, 2018

(65) Prior Publication Data

US 2019/0168737 A1    Jun. 6, 2019

(30) Foreign Application Priority Data

Dec. 5, 2017 (JP) .................. 2017-233274

(51) Int. Cl.
  *B60W 20/13* (2016.01)
  *B60L 53/00* (2019.01)
  (Continued)

(52) U.S. Cl.
  CPC ........... *B60W 20/13* (2016.01); *B60K 6/445* (2013.01); *B60L 50/15* (2019.02); *B60L 50/16* (2019.02);
  (Continued)

(58) Field of Classification Search
  CPC ....... B60L 58/12; B60L 58/13; B60L 58/1358; B60L 58/14; B60L 50/61; B60W 20/13; B60W 2510/244; B60W 10/26
  (Continued)

(56) References Cited

U.S. PATENT DOCUMENTS 6,507,127 B1 * 1/2003 Amano ................ B60K 1/02
                                                          290/400
8,229,615 B2 * 7/2012 Sakamoto ............ B60K 6/445
                                                           701/22
(Continued)

FOREIGN PATENT DOCUMENTS

BR    102018067307 A2 *  6/2019 ............ B60K 6/445
CN       109878496 A   *  6/2019 ............ B60K 6/445
(Continued)

*Primary Examiner* — Cuong H Nguyen
(74) *Attorney, Agent, or Firm* — Finnegan, Henderson, Farabow, Garrett & Dunner, LLP

(57) ABSTRACT

A control device for a hybrid vehicle, the hybrid vehicle including an internal combustion engine, an electric motor, and a battery, includes an electronic control unit configured to: i) set a target SOC which is a target value of an SOC of the battery when the hybrid vehicle arrives at a prescribed charging base; ii) when the hybrid vehicle is traveling outside the charging base, control output of the internal combustion engine and the electric motor such that the SOC at a time when the vehicle arrives at the charging base is the target SOC; and iii) estimate a charging possibility which is a possibility that the battery is charged with an external power source in the charging base when the hybrid vehicle arrives at the charging base, and set the target SOC lower when the estimated charging possibility is high than when the estimated charging possibility is low.

7 Claims, 14 Drawing Sheets

(51) Int. Cl.
| | |
|---|---|
| *B60L 58/12* | (2019.01) |
| *B60L 50/16* | (2019.01) |
| *B60W 10/26* | (2006.01) |
| *B60L 50/15* | (2019.01) |
| *B60W 50/00* | (2006.01) |
| *B60W 10/08* | (2006.01) |
| *B60K 6/445* | (2007.10) |
| *B60W 10/06* | (2006.01) |
| *B60W 20/12* | (2016.01) |
| *B60W 20/20* | (2016.01) |
| *B60K 6/28* | (2007.10) |
| *B60W 20/11* | (2016.01) |
| *B60K 6/26* | (2007.10) |

(52) U.S. Cl.
CPC .............. *B60L 53/00* (2019.02); *B60L 58/12* (2019.02); *B60W 10/06* (2013.01); *B60W 10/08* (2013.01); *B60W 10/26* (2013.01); *B60W 20/12* (2016.01); *B60W 50/0097* (2013.01); *B60K 6/26* (2013.01); *B60K 6/28* (2013.01); *B60L 2240/60* (2013.01); *B60W 20/11* (2016.01); *B60W 20/20* (2013.01); *B60W 2530/14* (2013.01); *B60W 2550/12* (2013.01); *B60W 2550/402* (2013.01); *B60W 2550/404* (2013.01); *B60W 2710/244* (2013.01)

(58) Field of Classification Search
USPC ................ 701/22; 180/65.21, 65.285, 65.29; 290/50; 320/137, 155
See application file for complete search history.

(56) References Cited

U.S. PATENT DOCUMENTS

| | | | | |
|---|---|---|---|---|
| 8,498,766 | B2* | 7/2013 | Takahashi | B60L 1/003 701/22 |
| 9,187,085 | B1* | 11/2015 | Nallapa | B60L 58/12 |
| 9,272,634 | B2* | 3/2016 | Li | B60L 1/003 |
| 9,539,912 | B2* | 1/2017 | Li | B60L 50/66 |
| 9,545,854 | B2* | 1/2017 | Daum | B60L 11/1861 |
| 9,849,871 | B2* | 12/2017 | Dunlap | B60W 20/13 |
| 9,937,794 | B2* | 4/2018 | Bellin | B60K 35/00 |
| 2002/0188387 | A1* | 12/2002 | Woestman | B60L 58/22 701/22 |
| 2008/0211230 | A1* | 9/2008 | Gurin | B60W 10/08 290/2 |
| 2009/0033290 | A1* | 2/2009 | Tomura | B60R 16/033 320/149 |
| 2010/0019718 | A1* | 1/2010 | Salasoo | B60L 3/0046 320/103 |
| 2010/0204863 | A1* | 8/2010 | Sakamoto | B60K 6/445 701/22 |
| 2011/0160019 | A1* | 6/2011 | Harada | B60K 6/445 477/7 |
| 2012/0109443 | A1* | 5/2012 | Takahashi | B60L 1/003 701/22 |
| 2012/0268077 | A1* | 10/2012 | Kumar | B60L 3/0046 320/155 |
| 2012/0316717 | A1* | 12/2012 | Daum | B60L 11/1861 701/22 |
| 2013/0066493 | A1* | 3/2013 | Martin | B60W 20/00 701/22 |
| 2014/0039735 | A1* | 2/2014 | Major | G06F 17/00 701/22 |
| 2015/0091531 | A1* | 4/2015 | Hyde | G05B 19/042 320/137 |
| 2015/0095074 | A1* | 4/2015 | Hyde | G05B 19/042 705/7.12 |
| 2015/0298565 | A1* | 10/2015 | Iwamura | G01C 21/3476 701/22 |
| 2016/0047862 | A1* | 2/2016 | Shimizu | H02J 3/00 702/63 |
| 2016/0250943 | A1* | 9/2016 | O'Connell | H02J 3/008 701/22 |
| 2017/0028978 | A1* | 2/2017 | Dunlap | B60W 20/13 |
| 2017/0259683 | A1* | 9/2017 | Shimizu | B60L 53/665 |
| 2017/0261560 | A1* | 9/2017 | Goto | G01R 31/3648 |
| 2018/0334170 | A1* | 11/2018 | Liu | B60W 30/192 |
| 2019/0168737 | A1* | 6/2019 | Takahashi | B60W 20/13 |

FOREIGN PATENT DOCUMENTS

| | | | |
|---|---|---|---|
| EP | 3 160 809 A1 | 5/2017 | |
| EP | 3 225 491 A1 | 10/2017 | |
| EP | 3495215 A1 * | 6/2019 | ............ B60K 6/445 |
| JP | 06-294375 A | 10/1994 | |
| JP | 8-154307 | 6/1996 | |
| JP | 9-163506 | 6/1997 | |
| JP | 2008-100645 A | 5/2008 | |
| JP | 2010-279108 A | 12/2010 | |
| JP | 2013-159139 A | 8/2013 | |
| JP | 2016-013792 A | 1/2016 | |
| JP | 2016-088440 A | 5/2016 | |
| WO | WO2010/150665 A1 | 12/2010 | |
| WO | WO 2013/055830 A1 | 4/2013 | |
| WO | WO2014/033944 A1 | 3/2014 | |
| WO | WO 2015/197094 A1 | 12/2015 | |

* cited by examiner

CONTROL DEVICE FOR HYBRID VEHICLE

INCORPORATION BY REFERENCE

The disclosure of Japanese Patent Application No. 2017-233274 filed on Dec. 5, 2017 including the specification, drawings and abstract is incorporated herein by reference in its entirety.

BACKGROUND

1. Technical Field

The present disclosure relates to a control device for a hybrid vehicle.

2. Description of Related Art

Hybrid vehicles including an internal combustion engine, an electric motor, and a battery connected to the electric motor are known. Such hybrid vehicles are configured such that the battery can be charged with electric power generated with the output of the internal combustion engine and that the electric power supplied from the battery is used to drive an electric generator. Some hybrid vehicles are configured such that an external power source can be used to charge the battery (for example, Japanese Patent Application Publication No. 9-163506 (JP 9-163506 A), Japanese Patent Application Publication No. 8-154307 (JP 8-154307 A)).

For such hybrid vehicles (for example, plug-in hybrid vehicles) that can use the external power source to charge the battery, it is ideal to consume all the electric power charged in the battery before the next charging is performed with the external power source. By consuming all the charged electric power, the operation time of the internal combustion engine can be minimized. As a result, emission of carbon dioxide relating to operation of the internal combustion engine can be suppressed.

In a hybrid vehicle disclosed in JP 9-163506 A, a target value of the state of charge of the battery is set, based on a travel route to a destination, in each spot on the travel route. When the vehicle is traveling, the target value is compared with an actual state of charge of the battery at present time in each spot. As a result of comparison, when the actual state of charge of the battery is higher than the target value, a ratio of torque generated by the electric motor is increased. As a result, more electric power of the battery is used. When the actual state of charge of the battery is lower than the target value, the ratio of torque generated by the internal combustion engine is increased. As a result, less electric power of the battery is used. According to JP 9-163506 A, performing such control makes it possible to adjust the state of charge of the battery to the target value, for example, to practically zero, by the time the hybrid vehicle arrives at the destination, and thereby the operation time of the internal combustion engine can be reduced.

SUMMARY

There are cases where, for example, a driver does not connect a hybrid vehicle to an external power source even when the hybrid vehicle arrives at a charging base, such as a residence. In such cases where the hybrid vehicle is not connected to the external power source in the charging base, the hybrid vehicle is forced to start next travel in the state where the state of charge of the battery is practically zero, if the hybrid vehicle is controlled such that the state of charge of the battery becomes practically zero at the time when the hybrid vehicle arrives at the destination. When traveling of the hybrid vehicle is performed in the state where the state of charge of the battery is practically zero, it becomes necessary to restrict the output of the electric motor. This makes it difficult to obtain sufficient motive power performance of the vehicle.

The present disclosure provides a control device that suppresses deterioration in motive power performance of a vehicle, while minimizing operation time of an internal combustion engine.

An aspect of the present disclosure relates to a control device for a hybrid vehicle, the hybrid vehicle including an internal combustion engine, an electric motor, and a battery connected to the electric motor, the hybrid vehicle being configured to charge the battery with electric power generated with output of the internal combustion engine, the hybrid vehicle being configured to drive the electric motor with the electric power supplied from the battery, the hybrid vehicle being configured to charge the battery with an external power source, the control device comprising an electronic control unit, the electronic control unit being configured to: i) set a target charging rate, the target charging rate being a target value of a state of charge of the battery when the hybrid vehicle arrives at a prescribed charging base; ii) when the hybrid vehicle is traveling outside the charging base, control output of the internal combustion engine and the electric motor such that the state of charge at a time when the hybrid vehicle arrives at the charging base is the target charging rate; and iii) estimate a charging possibility and set the target charging rate lower when the estimated charging possibility is high than when the estimated charging possibility is low, the charging possibility being a possibility that the battery is charged with an external power source in the charging base when the hybrid vehicle arrives at the charging base.

In the above aspect, the charging possibility may be estimated based on a charging history which is a history of charging the battery with the external power source when the hybrid vehicle stopped at the charging base in the past.

In the above aspect, the charging history may include an external charging frequency that is a frequency of charging the battery with the external power source when the hybrid vehicle stopped at the charging base in the past. The electronic control unit may be configured to set the target charging rate lower when the external charging frequency is high than when the external charging frequency is low.

In the above aspect, the external charging frequency may be a frequency of charging the battery with the external power source while the hybrid vehicle stopped in the base when the state of charge at a time when the hybrid vehicle arrives at the charging base is equal to or less than a predetermined value.

In the above aspect, the charging history may include an external charging frequency in each of a plurality of vehicle environment states when the hybrid vehicle stopped in the charging base in the past. The electronic control unit may be configured to: i) acquire a vehicle environment state being a vehicle environment state at a present time or a vehicle environment state at a time when the hybrid vehicle is expected to arrive at the charging base; and ii) set the target charging rate lower when the acquired vehicle environment state is a vehicle environment state in which the external charging frequency is high than when the acquired vehicle environment state is a vehicle environment state in which the external charging frequency is low.

In the above aspect, the vehicle environment states are different at least in one of following categories: (i) a time slot, (ii) a day of the week, (iii) weather, (iv) a driver, and (v) number of occupants.

In the above aspect, the charging possibility is estimated based on weather in a current location or in the charging base, the weather being weather at a present time or weather at a time when the hybrid vehicle is expected to arrive at the charging base.

The present disclosure suppresses deterioration in motive power performance of the vehicle, while minimizing operating time of the internal combustion engine.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the present disclosure will be described in detail with reference to the drawings. In the following description, like component members are designated by like reference numbers.

First Embodiment

Configuration of Vehicle

Figure 1:
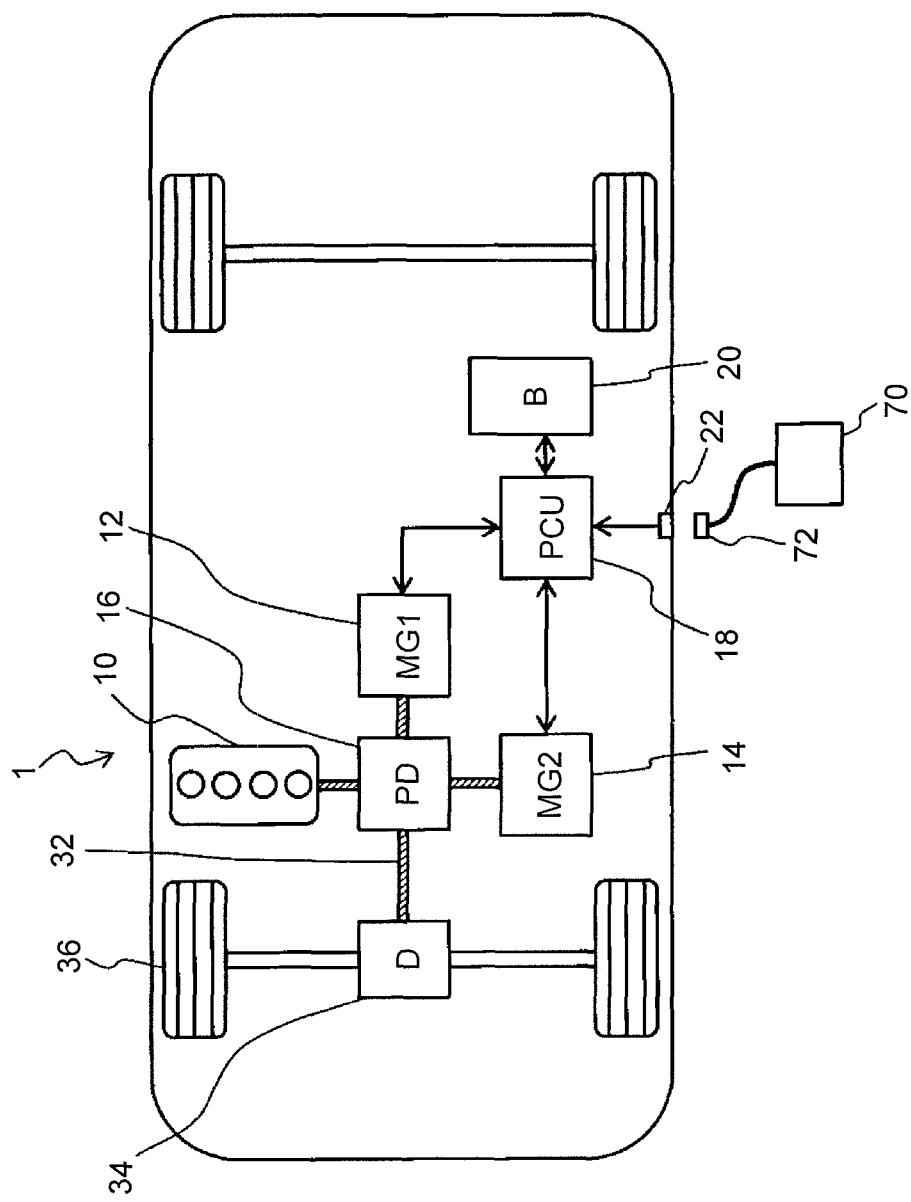
FIG. 1 schematically illustrates a hybrid vehicle according to a first embodiment.

FIG. 1 schematically illustrates a hybrid vehicle 1 mounted with a control device according to a first embodiment. As illustrated in FIG. 1, the vehicle 1 includes an internal combustion engine 10, a first motor generator 12, a second motor generator 14, and a power split device 16. In addition, the vehicle 1 includes a power control unit (PCU) 18 electrically connected to the first motor generator 12 and the second motor generator 14, a battery 20 electrically connected to the PCU 18, and a vehicle-side connector 22.

The internal combustion engine 10 is a motor that burns fuel, such as gasoline and diesel fuel, inside an engine, and converts the thermal energy of combustion gas into mechanical energy. The output of the internal combustion engine 10 is controlled by adjusting the amount of fuel and air supplied to the internal combustion engine 10. The internal combustion engine 10 has an output shaft (crankshaft) mechanically coupled with the power split device 16. The motive power generated by the internal combustion engine 10 is input into the power split device 16.

The first motor generator 12 has input and output shafts mechanically coupled with the power split device 16 and electrically connected to the PCU 18. When the PCU 18 supplies electric power to the first motor generator 12, the first motor generator 12 is driven by the electric power and outputs motive power to the power split device 16. Therefore, in this case, the first motor generator 12 functions as an electric motor.

When motive power is input from the power split device 16 into the first motor generator 12, the first motor generator 12 is driven with the motive power, and generates electric power. The generated electric power is supplied to the battery 20 through the PCU 18, and charging of the battery 20 is performed. Therefore, in this case, the first motor generator 12 functions as an electric generator. The first motor generator 12 may be an electric generator that does not function as an electric motor.

The second motor generator 14 has input and output shafts mechanically coupled with the power split device 16 and electrically connected to the PCU 18. When the PCU 18 supplies electric power to the second motor generator 14, the second motor generator 14 is driven with the electric power, and outputs motive power to the power split device 16. Therefore, in this case, the second motor generator 14 functions as an electric motor.

When motive power is input from the power split device 16 into the second motor generator 14, the second motor generator 14 is driven with the motive power, and generates electric power. The generated electric power is supplied to the battery 20 through the PCU 18, and charging of the battery 20 is performed. Therefore, in this case, the second motor generator 14 functions as an electric generator. The second motor generator 14 may be an electric motor that does not function as a motor generator.

The power split device 16 is mechanically coupled with the internal combustion engine 10, the first motor generator 12, and the second motor generator 14. In addition, the power split device 16 is coupled with a driving shaft 32. The driving shaft 32 is coupled with wheels through a differential gear 34. In the present embodiment in particular, the power split device 16 includes a planetary gear mechanism. In the planetary gear mechanism, for example, a sun gear is coupled with the input and output shafts of the first motor generator 12, a planetary gear is coupled with an output shaft of the internal combustion engine 10, and a ring gear is coupled with the input and output shafts of the second motor generator 14.

The power split device 16 is configured such that the motive power, input into the power split device 16 from any one of the internal combustion engine 10, the first motor generator 12, the second motor generator 14, and the driving shafts 32 which are coupled with the power split device 16, can be output to at least one of these component members which are coupled with the power split device 16. Therefore, for example, when motive power is input into the power split device 16 from the internal combustion engine 10, the motive power is output to at least any one of the first motor generator 12, the second motor generator 14, and the driving shafts 32. Similarly, when motive power is input into the power split device 16 from the first motor generator 12, the motive power is output to at least any one of the internal combustion engine 10, the second motor generator 14, and the driving shafts 32. In addition, when motive power is input into the power split device 16 from the second motor generator 14, the motive power is output to at least any one of the internal combustion engine 10, the first motor generator 12, and the driving shafts 32.

The PCU 18 includes an inverter and a DCDC converter. The PCU 18 is electrically connected to the first motor generator 12, the second motor generator 14, and the battery 20. The PCU 18 performs control of the first motor generator 12, the second motor generator 14, and the battery 20. The PCU 18 also performs conversion of the electric power supplied to the motor generators 12, 14 from the battery 20, and conversion of the electric power supplied to the battery 20 from the motor generators 12, 14.

The battery 20 is electrically connected to the PCU 18, and stores electric power. When the first motor generator 12 or the second motor generator 14 is driven with the motive power input from the power split device 16, charging of the battery 20 is performed through the PCU 18. When the first motor generator 12 or the second motor generator 14 outputs motive power to the power split device 16, electric power is supplied from the battery 20 to the first motor generator 12 or the second motor generator 14 through the PCU 18.

The vehicle-side connector 22 is a connector for connecting the vehicle 1 with an external power source 70. The vehicle-side connector 22 is electrically connected to the PCU 18. The vehicle-side connector 22 is configured to allow connection with an external connector 72 that is electrically connected to the external power source 70. When the vehicle-side connector 22 is connected to the external connector 72, electric power is supplied from the external power source 70 to the battery 20 through the vehicle-side connectors 22, the external connector 72, and the PCU 18. Therefore, the vehicle 1 is configured to enable the battery 20 to be charged with the external power source 70.

In the thus-configured vehicle 1, electric power can be generated by the first motor generator 12 or the second motor generator 14 when some or all of the motive power which is obtained by the internal combustion engine 10 is input into the first motor generator 12 or the second motor generator 14. The electric power obtained by the power generation is used for charging the battery 20, or is supplied to one of the first motor generator 12 and the second motor generator 14, which is not generating electric power, through the PCU 18. Therefore, the vehicle 1 is configured to enable the battery 20 to be charged with the electric power generated with the output of the internal combustion engine 10. When some or all of the motive power obtained by the internal combustion engine 10 is input into the driving shaft 32, the wheels 36 can be rotated with the motive power.

The vehicle 1 is configured to enable the first motor generator 12 or the second motor generator 14 to be driven with the electric power supplied from the battery 20. The motive power obtained by driving of the first motor generator 12 or the second motor generator 14 can be input into the internal combustion engine 10. Therefore, the internal combustion engine 10 in a stopped state can be started up with such motive power. When the motive power obtained by driving of the first motor generator 12 or the second motor generator 14 is input into the driving shaft 32, the wheels 36 can be rotated with the motive power.

Figure 2:
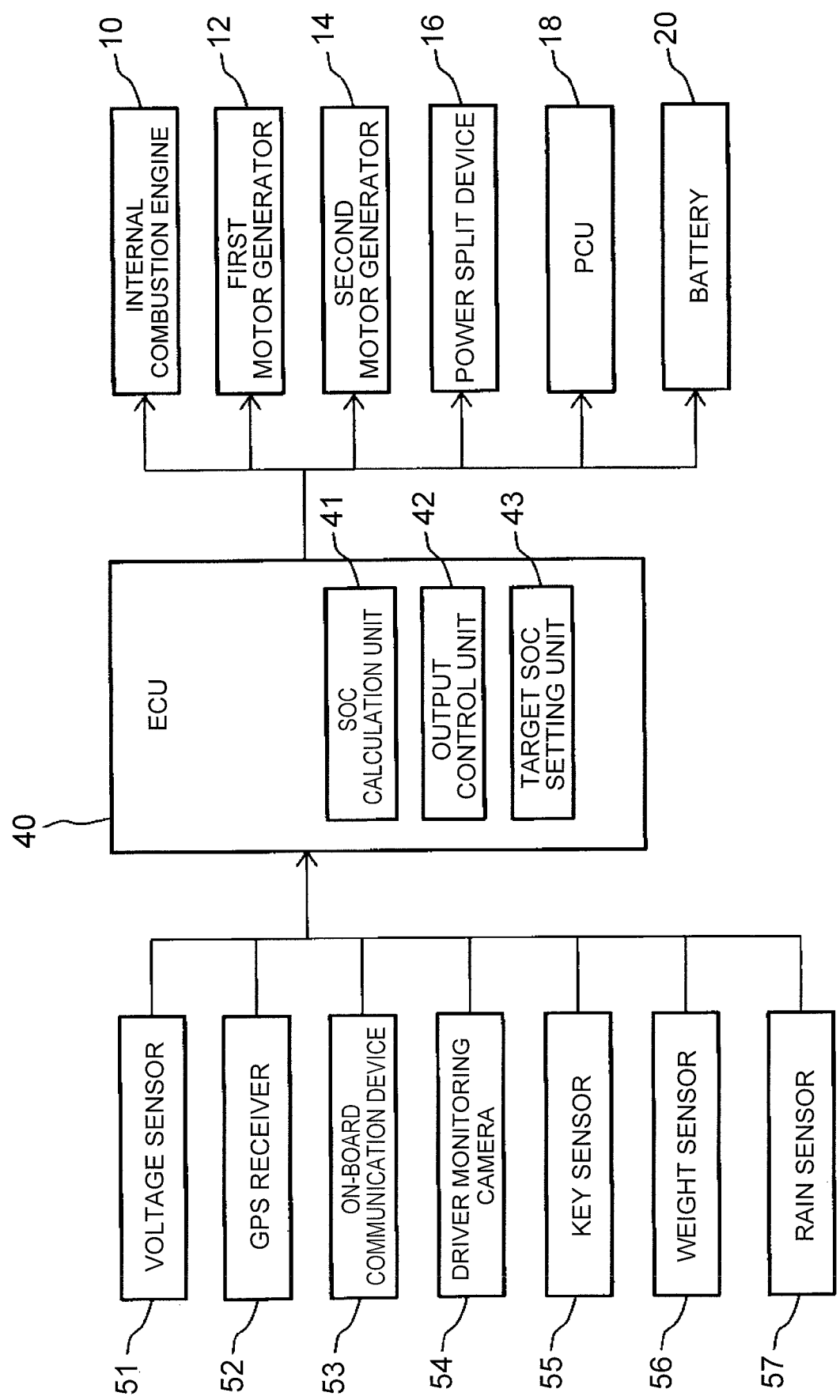
FIG. 2 is a block diagram schematically illustrating a control device that controls the hybrid vehicle.

FIG. 2 is a block diagram schematically illustrating a control device that controls the vehicle 1. As illustrated in FIG. 2, the control device of the vehicle 1 includes an electronic control unit (ECU) 40. In the present embodiment, although one ECU 40 is provided, a plurality of ECUs may be provided for each function, the ECUs being connected to each other through a bus that conforms to a controller area network (CAN) or other protocols. The ECU 40 is connected to the internal combustion engine 10, the first motor generator 12, the second motor generator 14, the power split device 16, the PCU 18, and the battery 20 to control the component members.

The control device also includes various sensors and communication devices. In the example illustrated in FIG. 2, the control device includes a voltage sensor 51, a GPS receiver 52, an on-board communication device 53, a driver monitoring camera 54, a key sensor 55, a weight sensor 56, and a rain sensor 57.

The voltage sensor 51 is attached to the battery 20 and is configured to detect the voltage between both the electrodes of the battery 20. The voltage sensor 51 is also connected to the ECU 40 to transmit the detected voltage to the ECU 40. The GPS receiver 52 is configured to receive signals from three or more GPS Satellites and detect a current location (for example, latitude and longitude of the vehicle 1) of the vehicle 1. The GPS receiver 52 is connected to the ECU 40 to transmit the detected current location information to the ECU 40.

The on-board communication device 53 is configured to perform wireless communications with a radio base station that covers the range in which each vehicle 1 is located. Therefore, the on-board communication device 53 can send data to external servers or receive date from the external servers. Since the on-board communication device 53 is connected to the ECU 40, various information, including traffic congestion information, and weather information on various areas, is transmitted to the ECU 40 through the on-board communication device 53.

The driver monitoring camera 54 is a device for photographing the face of a driver. The driver monitoring camera 54 is connected to the ECU 40 to transmit the photographed facial image to the ECU 40. The key sensor 55 is a sensor that acquires the information on a plurality of keys of the vehicle 1. Accordingly, the vehicle 1 can distinguish which driver, among a plurality of drivers who own the keys, is the current driver, for example. The key sensor 55 is connected to the ECU 40, and the acquired key information is transmitted to the ECU 40.

The weight sensor 56 is a sensor that detects the weight of a loaded object on each seat of the vehicle 1. Accordingly, the vehicle 1 can determine whether or not each seat is occupied by a person. The weight sensor 56 is connected to the ECU 40, and the weight sensor 56 transmits the weight of the detected loaded object on each seat to the ECU 40. The rain sensor 57 is a sensor that determines whether or not it is raining around the vehicle 1. The rain sensor 57 is connected to the ECU 40. An output signal of the rain sensor 57 is transmitted to the ECU 40.

In the present embodiment, the ECU 40 includes an SOC calculation unit 41, an output control unit 42, and a target SOC setting unit 43.

The SOC calculation unit 41 detects a state of charge (SOC) of the battery 20 at present time. Since the voltage across both the electrodes of the battery 20 changes in accordance with the SOC of the battery 20, the SOC calculation unit 41 calculates the SOC based on the voltage detected by the voltage sensor 51.

The output control unit 42 controls each output of the internal combustion engine 10, the first motor generator 12, and the second motor generator 14. The target SOC setting unit 43 sets a target SOC that is a target value of the SOC of the battery when the vehicle arrives at a prescribed charging base. A specific control method performed by the output control unit 42 and a setting method of the target SOC performed by the target SOC setting unit 43 will be described later.

Operation Mode

A description is now given of the control method of the output of the internal combustion engine 10 and the output of the motor generators 12, 14 performed by the output control unit 42. The output control unit 42 controls the internal combustion engine 10 and the motor generators 12, 14 in two operation modes: a first operation mode; and a second operation mode.

The first operation mode is an operation mode in which a ratio (hereinafter, referred to as "engine operation ratio") of the operating period of the internal combustion engine (a period during which the internal combustion engine rotates) to the operation period of the vehicle 1 (a period during which an ignition switch is set to ON) is relatively small. The second operation mode is an operation mode in which the engine operation ratio is relatively large.

Here, the vehicle 1 is driven mainly in three driving states. In a first driving state, the internal combustion engine 10 is in a stopped state, and the motive power from one of or both the first motor generator 12 and the second motor generator 14 is output to the driving shaft 32. Therefore, the vehicle 1 is driven by only the motor generators 12, 14 in the first driving state. In the first driving state, charging of the battery 20 is not performed, and electric power is supplied from the battery 20 to the motor generators 12, 14.

In a second driving state, the internal combustion engine 10 is in operation, and some of the motive power obtained from the internal combustion engine 10 is output to the driving shaft 32, and the rest of the motive power is output to the first motor generator 12 or the second motor generator 14. The motor generator 12 or 14 that received the motive power from the internal combustion engine 10 generates electric power, with which the battery 20 is charged. In the second driving state, the vehicle 1 is basically driven by the internal combustion engine 10, and the first motor generator 12 or the second motor generator 14 generates electric power. In the second driving state, one of the motor generators 12, 14 that does not generate electric power may output motive power to the driving shaft 32.

In a third driving state, the internal combustion engine 10 is in operation, and the motive power obtained from the internal combustion engine 10 and the motive power obtained from the first motor generator 12 or the second motor generator 14 is output to the driving shaft 32. Therefore, in the third driving state, the vehicle 1 is driven by the internal combustion engine 10 and the motor generator 12 or 14. In the third driving state, charging of the battery 20 is not performed, and electric power is supplied from the battery 20 to the motor generators 12, 14.

In the first operation mode, the period of driving the vehicle 1 in the first driving state is longer than that in the second operation mode. As a result, the engine operation ratio becomes relatively small. Therefore, when the output control unit 42 performs control in the first operation mode, the SOC of the battery 20 gradually decreases. When the output control unit 42 performs control in the second operation mode, the SOC of the battery 20 is basically maintained constant or increases. There is a case where the SOC of the battery 20 gradually decreases even under the control in the second operation mode. In such a case, the rate of decrease of the SOC in the second mode is still slower than the rate of decease of the SOC in the first operation mode.

Specifically, the first operation mode is a mode (an electric vehicle mode, hereinafter will be referred to as "EV mode") in which, for example, while operation of the internal combustion engine 10 is stopped, the motive power from the first motor generator 12 or the second motor generator 14 is output to the driving shaft 32 (that is, a mode of driving the vehicle 1 only in the first driving state). Therefore, in the EV mode, the engine operation ratio is practically zero. Contrary to this, the second operation mode is a mode (a hybrid vehicle mode, hereinafter will be referred to as "HV mode") in which, for example, while the internal combustion engine 10 is operated or stopped depending on the circumstances so as to output motive power to the driving shaft 32, the motive power from the first motor generator 12 and the second motor generator 14 is also output to the driving shaft 32 depending on the circumstances (that is, a mode of driving the vehicle 1 in the first driving state, the second driving state, and the third driving state depending on the circumstances).

In the present embodiment, the internal combustion engine 10 and the motor generators 12, 14 are controlled in two operation modes including the first operation mode and the second operation mode. However, the internal combustion engine 10 and the motor generators 12, 14 may be controlled in three or more different operation modes. However, in that case, the three or more different operation modes need to be different in engine operation ratio from each other.

SOC Control

Figure 3:
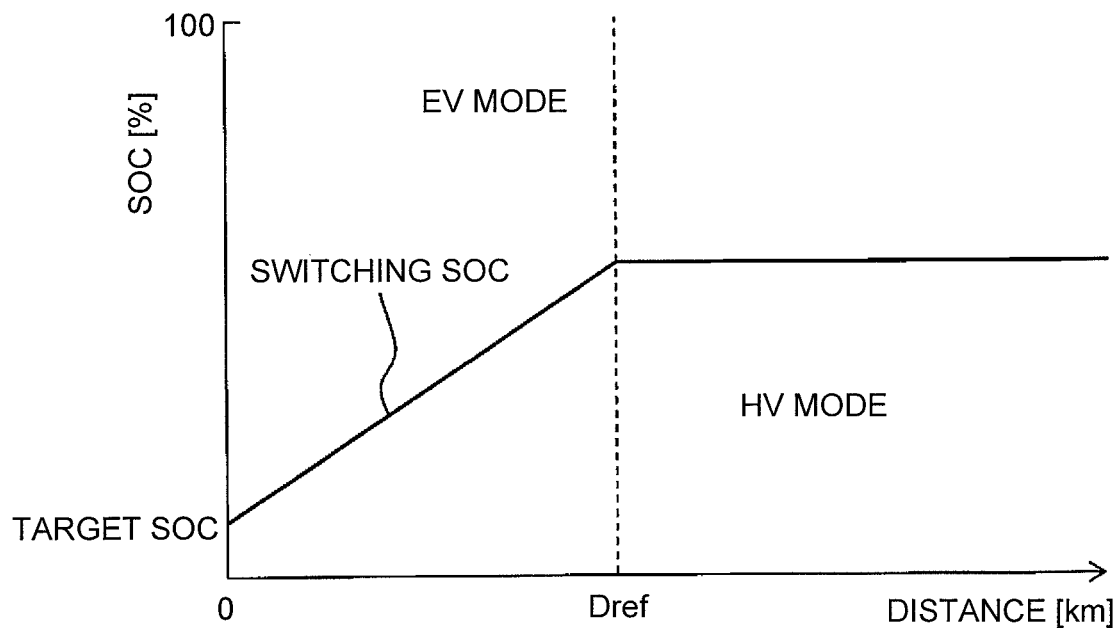
FIG. 3 illustrates a relationship between the distance to a charging base and an SOC and an operation mode.

Next, SOC control in the present embodiment will be described with reference to FIGS. 3 and 4. FIG. 3 illustrates a relationship between the distance to a charging base and the SOC and the operation mode. In the following description, the first operation mode is the EV mode, and the second operation mode is the HV mode for easy understanding.

Now, in the case where the battery 20 can be charged with the external power source 70 as in the vehicle 1 of the present embodiment, the SOC of the battery 20 is preferably as low as possible when the vehicle 1 arrives at a charging base (for example, a residence) that is provided with the external power source 70. Decreasing the SOC of the battery 20 at the time when the vehicle 1 arrives at the charging base makes it possible to shorten the operating period of the internal combustion engine 10 during traveling of the vehicle 1, and to thereby suppress the amount of fuel consumption. In the charging base, the external connector 72 is connected to the vehicle-side connector 22, and the battery 20 can be charged. Accordingly, the SOC of the battery 20 can be increased.

Accordingly, in the present embodiment, the output control unit 42 controls the internal combustion engine 10 and the motor generators 12, 14 such that, when the vehicle 1 is traveling outside the charging base, the SOC of the battery 20 at the time when the vehicle 1 arrives at the charging base is a target SOC (relatively low SOC).

Here, when the vehicle 1 is traveling outside a certain charging base, the electric power amount required for the vehicle 1 to arrive at the charging base from a current location driving only in the EV mode is proportional to the distance from the current location to the charging base. Therefore, when a travel distance from the current location to the charging base can be obtained, the electric power amount required for the vehicle 1 to arrive at the charging base from the current location driving only in the EV mode can be obtained. Accordingly, in the present embodiment, the electric power required to arrive at the charging base is calculated based on the distance from the current location to the charging base, and a switching SOC is calculated by adding the calculated electric power to the target SOC. When the SOC at present time is equal to or greater than the switching SOC, the output control unit 42 controls the internal combustion engine 10 and the motor generators 12, 14 in the EV mode. Meanwhile, when the SOC at present time is less than the switching SOC, the output control unit 42 controls the internal combustion engine 10 and the motor generators 12, 14 in the HV mode.

As a result, as illustrated in FIG. 3, when the distance from the charging base is practically zero, the switching SOC is set to the target SOC. As the distance from the charging base increases, the switching SOC is set to a larger value. However, when the distance from the charging base becomes equal to or greater than a reference value Dref, the switching SOC is maintained constant. A sufficient SOC is an SOC high enough to satisfy motive power performance. Accordingly, when the SOC becomes higher than the sufficient SOC, following events may occur. That is, the charging amount at the charging base, which is used for the first time, is decreased, and the vehicle 1 fails to charge the battery 20 with the electric power obtained by regeneration brake performed while traveling on a long downward slope, for example.

Examples of the charging base may include charging stands, and offices, in addition to the residence. Therefore, the charging base is not necessarily limited to one, but, in many cases, a plurality of charging bases are present. In such a case, the switching SOC is calculated in consideration of the charging bases around the current location of the vehicle 1.

Figure 4:
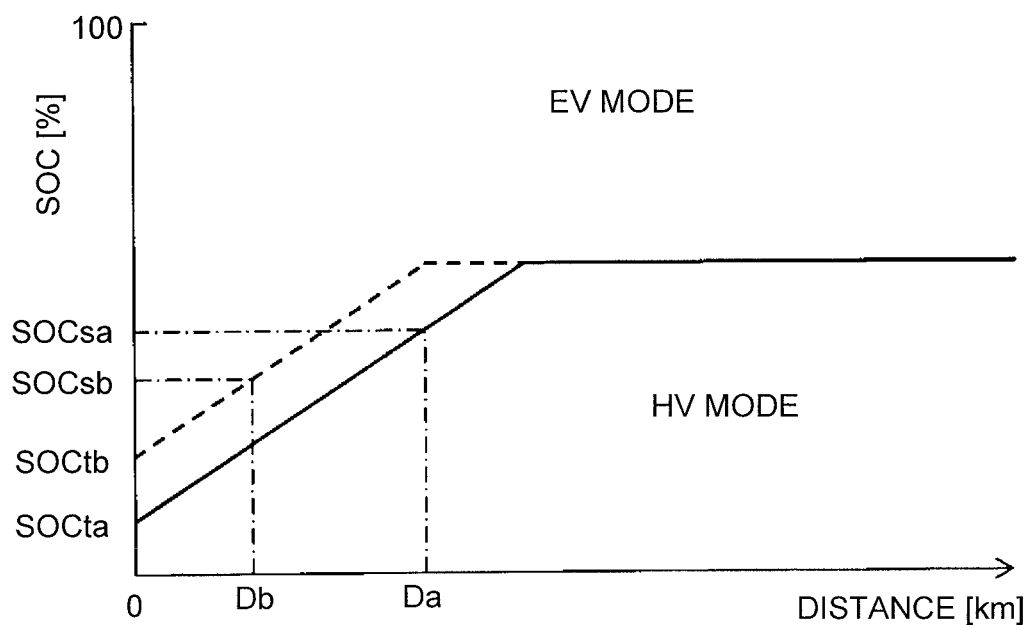
FIG. 4 illustrates a relationship similar to that in FIG. 3 with a plurality of charging bases present around the vehicle.

FIG. 4 illustrates a relationship similar to that in FIG. 3 with a plurality of charging bases present around the vehicle 1. In the example illustrated in FIG. 4, the distance from a current location of the vehicle 1 to a charging base a is Da, and the distance from the current location to a charging base b is Db (<Da). In addition, the target SOC may be different for each charging base as described later. In the example illustrated in FIG. 4, the target SOC in the charging base a is SOCta, and the target SOC in the charging base b is SOCtb (>SOCta).

In such a case, as for the charging base a, the relationship between the distance to the charging base and the SOC and the operation mode is as illustrated with a solid line in the drawing. As for the charging base b, the relationship between the distance to the charging base and the SOC and the operation mode is as illustrated with a broken line in the drawing.

In the example illustrated in FIG. 4, the switching SOC in the current location is SOCsa in the relationship for the charging base a. In the relationship for the charging base b, the switching SOC in the current location is SOCsb. Here, the switching SOC in the current location is basically set to SOCsb since SOCsb is smaller than SOCsa. Therefore, in the situation of the example illustrated in FIG. 4, when the SOC at present time calculated based on the output of the voltage sensor 51 is equal to or greater than SOCsb, the output control unit 42 controls the internal combustion engine 10 and the motor generators 12, 14 in the EV mode. When the SOC at present time is less than the switching SOCsb, the output control unit 42 controls the internal combustion engine 10 and the motor generators 12, 14 in the HV mode.

In the embodiment, the switching SOC is calculated based on the distance from the current location to the charging base. However, the switching SOC may be calculated based on other parameters, such as the electric power amount required to arrive at the charging base from the current location, instead of the distance from the current location to the charging base. For example, in the case where a steep uphill slope is present in a route or in other cases, the electric power amount required for every certain distance increases. Accordingly, when the switching SOC is calculated based on the distance from the current location to the charging base, an adequate value is not necessarily be calculated. When an air conditioner (not illustrated) of the vehicle 1 is used, power consumption increases. Even in such cases, when the switching SOC is calculated based on the electric power amount required to arrive at the charging base from the current location, the switching SOC can appropriately be calculated.

In the embodiment, when the charging bases are present around the vehicle 1, the switching SOC is finally set to a smallest value, out of the switching SOCs calculated for each of the charging bases. However, when a destination of the vehicle 1 is input through a navigation system (not illustrated) and the like, and the destination is one of the charging bases, the switching SOC calculated in relation to that charging base may be set as the final switching SOC, for example.

Figure 5:
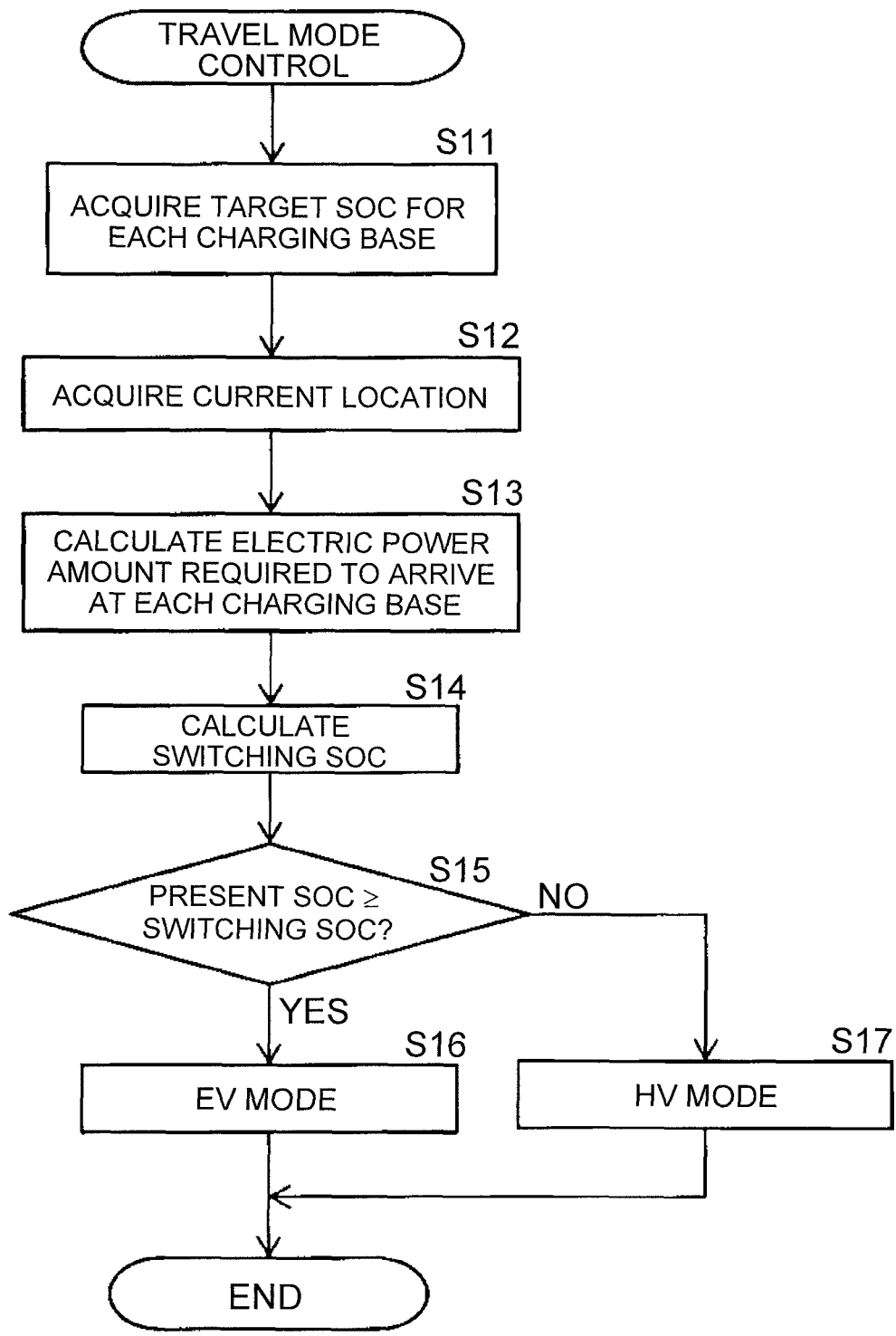
FIG. 5 is a flowchart illustrating a control routine of travel mode control that sets a travel mode.

FIG. 5 is a flowchart illustrating a control routine of travel mode control that sets the travel mode. The illustrated control routine is performed at constant time intervals.

First, in step S11, the target SOC for each charging base registered in the ECU 40 is acquired. The setting method of the target SOC for each charging base is described later. Next, in step S12, the current location of the vehicle 1 is acquired based on information such as the current location information detected by the GPS receiver 52.

Next, in step S13, the electric power amount required to arrive at each charging base is calculated from the current location. In calculation of the electric power amount, the electric power amount is calculated based on information such as the current location information detected by the GPS receiver 52, map information stored in the ECU 40, and traffic congestion information transmitted from the server through the on-board communication device 53.

Next, in step S14, the switching SOC for each charging base is calculated based on the target SOC for each charging base calculated in step S11 and the electric power amount required to arrive at each charging base calculated in step S13. Out of the switching SOC of each charging base, the smallest value is calculated as the final switching SOC.

Next, in step S15, it is determined whether or not the SOC at present time calculated based on the output of the voltage sensor 51 is equal to or greater than the switching SOC calculated in step S14. When it is determined in step S15 that the SOC at present time is equal to or greater than the switching SOC, the processing proceeds to step S16. In step S16, the output control unit 42 controls the internal combustion engine 10 and the motor generators 12, 14 in the EV mode, and the control routine is ended. When it is determined in step S15 that the SOC at present time is less than the switching SOC, the processing proceeds to step S17. In step S17, the output control unit 42 controls the internal combustion engine 10 and the motor generators 12, 14 in the HV mode, and the control routine is ended.

Problems

There is a case where, for example, a driver does not connect the vehicle 1 to the external power source 70 even when the vehicle 1 arrives at a charging base, such as a residence. Thus, when the vehicle 1 is not connected to the external power source 70 in the charging base while the target SOC is set to a low value, the vehicle 1 is forced to depart from the charging base in the state where the SOC is a low value when the vehicle 1 travels next time. When traveling of the vehicle 1 is performed in the state where the SOC is low, it becomes necessary to restrict the output of the electric motor. This makes it difficult to obtain sufficient motive power performance of the vehicle 1.

When the target SOC is set to a high value in consideration of the possibility that the driver does not connect the vehicle 1 with the external power source 70, the vehicle 1 will arrive at the charging base without sufficiently consuming the electric power stored in the battery 20. As a result, it becomes difficult to sufficiently shorten the operation time of the internal combustion engine, which results in failure in sufficiently suppressing the amount of fuel use in the internal combustion engine.

Setting Target SOC

Here, in the vehicle 1 of the present embodiment, the ECU 40 includes a target SOC setting unit 43 that sets the target SOC for each charging base. The target SOC setting unit 43 estimates, for each charging base, the possibility (hereinafter referred to as "charging possibility") that the battery 20 is charged with the external power source 70 in each charging base when the vehicle 1 arrives at each corresponding charging base. In addition, the target SOC setting unit 43 sets the target SOC lower when the estimated charging possibility is relatively high than when the estimated charging possibility is relatively low.

The charging possibility in each charging base is estimated based on, for example, a charging history that is a history of charging the battery 20 with the external power source 70 when the vehicle 1 stopped at each corresponding charging base in the past. In the present embodiment in particular, the charging history in each charging base includes an external charging frequency that is a frequency of charging the battery 20 with the external power source 70, when the vehicle 1 stopped at each corresponding charging base in the past.

Therefore, in the present embodiment, the target SOC in each charging base is set based on the past external charging frequency in each corresponding charging base. It can be said that the charging possibility in each charging base is higher, as the past external charging frequency in each corresponding charging base is higher. Accordingly, the target SOC is set lower when the past external charging frequency in each charging base is relatively high than when the past external charging frequency in each corresponding charging base is relatively low.

Figure 6:
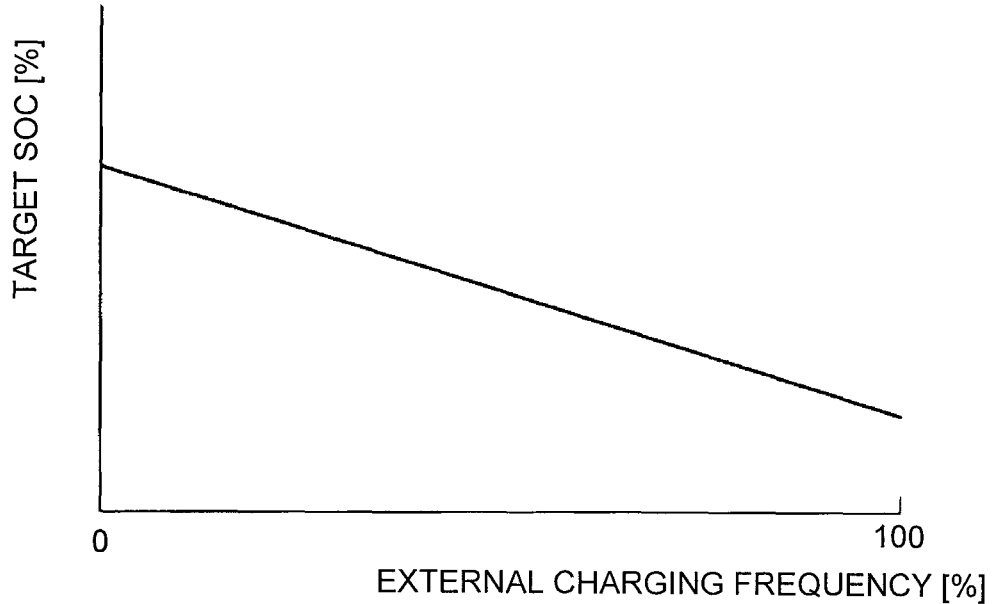
FIG. 6 illustrates a relationship between an external charging frequency and a target SOC.

FIG. 6 illustrates a relationship between the external charging frequency and the target SOC. The external charging frequency represents a ratio of the number of times that charging with the external power source 70 is performed while the vehicle is stopped at a certain charging base to the number of times that the vehicle 1 stopped at this certain charging base. Therefore, when charging has never been performed in the charging base when the vehicle 1 stopped therein, the external charging frequency becomes zero. When charging has always been performed whenever the vehicle 1 stopped at the charging base, the external charging frequency is 100%.

As is clear from FIG. 6, in the present embodiment, the target SOC in a certain charging base is set lower as the past external charging frequency in the charging base is higher. Therefore, in the present embodiment, the target SOC of a certain charging base is set lower as the charging possibility in the charging base is higher.

By setting the target SOC in this way, the SOC of the battery 20 is low when the vehicle 1 arrives at the charging base with a high charging possibility. Thus, the SOC of the battery 20 is low when the vehicle 1 arrives at the charging base, which makes it possible to minimize the operation time of the internal combustion engine 10 until the vehicle 1 arrives at the charging base, and thereby to suppress the amount of fuel consumption by the internal combustion engine 10. In addition, since the charging possibility is high in that charging base, there is a high possibility that the SOC of the battery 20 is sufficiently high when the vehicle 1 will start to travel again from the charging base. Accordingly, it is less likely that output restriction control of the motor generators 12, 14 is performed due to a low SOC of the battery 20 when the vehicle 1 starts to travel again. Therefore, sufficient motive power performance can be achieved.

Meanwhile, when the vehicle 1 arrives at a charging base with a low charging possibility, the SOC of the battery 20 is high. Since the charging possibility is low, there is a high possibility that the SOC of the battery 20 at the time when the vehicle 1 travels again from the charging base is unchanged from the SOC at the time when the vehicle 1 arrived at the charging base. However, even when the battery 20 is not charged with the external power source 70 while the vehicle stops in the charging base, and so the SOC is the same as the SOC at the time when the vehicle 1 arrived at the charging base, the SOC is still relatively high. Accordingly, there is a low necessity of performing the output restriction control of the motor generators 12, 14 due to a low SOC of the battery 20 when the vehicle 1 starts to travel again. Therefore, sufficient motive power performance can be achieved.

Explanation of Flowchart

Figure 7:
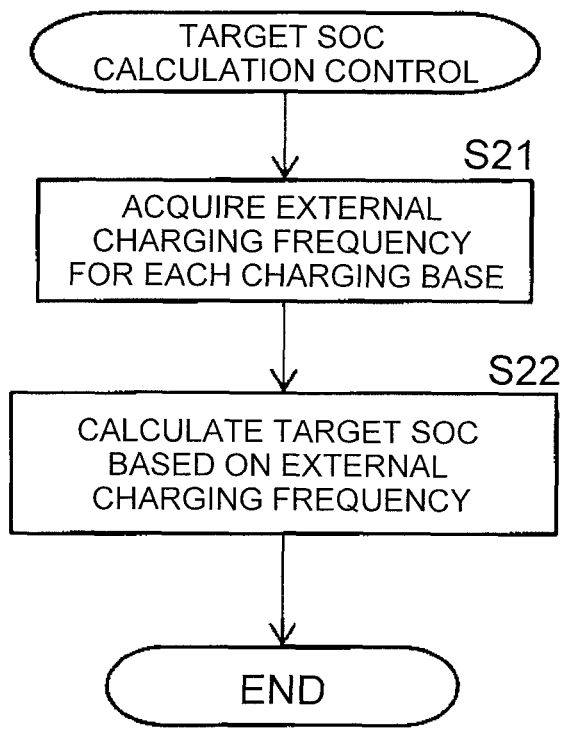
FIG. 7 is a flowchart illustrating a control routine of target SOC calculation control that calculates the target SOC in each charging base.

FIG. 7 is a flowchart illustrating a control routine of target SOC calculation control that calculates the target SOC in each charging base. The illustrated control routine is executed at constant time intervals or whenever an external charging frequency in each of the charging bases is updated.

As illustrated in FIG. 7, first in step S21, the external charging frequency for each charging base is acquired. For example, the external charging frequency is calculated for each charging base by external charging frequency calculation control described later with reference to FIG. 8. The calculated external charging frequency is stored in the memory of the ECU 40. In step S21, the external charging frequency for each charging base is acquired from the memory of the ECU 40.

Next, in step S22, the target SOC for each charging base is calculated with, for example, a map as illustrated in FIG. 6 based on the external charging frequency for each charging base acquired in step S21. Then, the control routine is ended.

Figure 8:
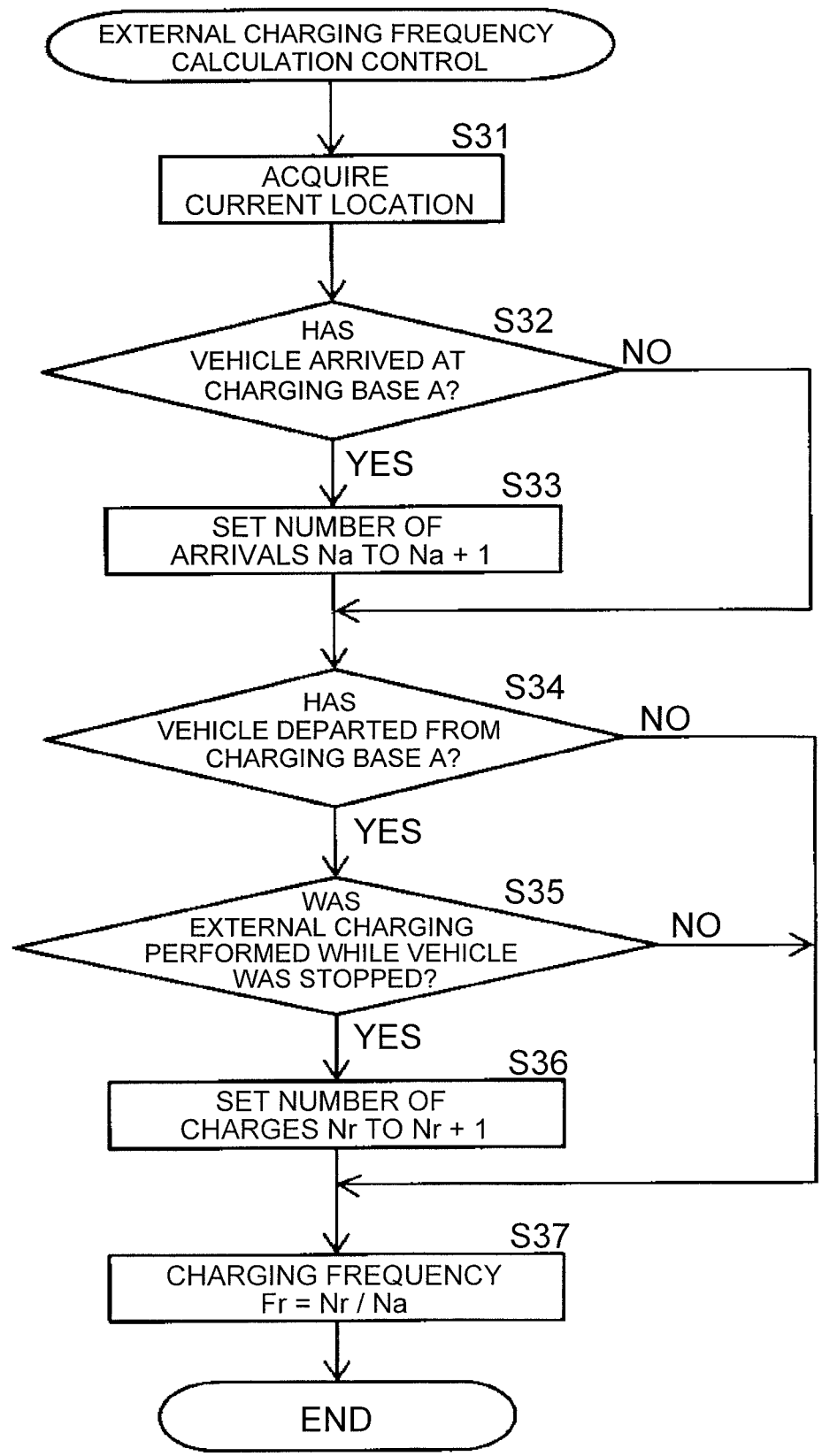
FIG. 8 is a flowchart illustrating a control routine of external charging frequency calculation control for calculating the external charging frequency in a certain charging base.

FIG. 8 is a flowchart illustrating a control routine of external charging frequency calculation control for calculating the external charging frequency in a certain charging base (charging base A). The illustrated control routine is executed at constant time intervals.

As illustrated in FIG. 8, first in step S31, a current location is acquired by the GPS receiver 52 or the like. Next, in step S32, it is determined based on the current location acquired in step S31 whether or not the vehicle 1 has just arrived at a certain specific charging base A. The charging base A is one of the charging bases registered in the ECU 40. Registration of the charging bases in the ECU 40 is manually performed by a user or users. Alternatively, when the vehicle 1 is charged in a certain facility, the ECU 40 may be configured to automatically register the facility as the charging base.

When it is determined in step S32 that the vehicle 1 has just arrived at the charging base A, a counter Na indicating the number of arrivals at the charging base A is incremented by one in step S33, and the processing proceeds to step S34. When it is determined that the vehicle 1 has not just arrived at the charging base A, that is, the vehicle 1 is traveling outside the charging base A, or the vehicle 1 is in a stopped state at the charging base A, then step S33 is skipped.

In step S34, it is determined based on the current location acquired in step S31 whether or not the vehicle 1 has just departed from the charging base A. When it is determined in step S34 that the vehicle 1 has just departed from the charging base A, the processing proceeds to step S35.

In step S35, it is determined whether or not the battery 20 was charged with the external power source 70 in the charging base A while the vehicle 1 stopped in the charging base A before departing from the charging base A. Whether or not the battery 20 was charged is determined by comparing, for example, the SOC when the vehicle 1 arrived at the charging base A and the SOC when the vehicle 1 departs from the charging base A. When the SOC at the time of departure from the charging base A is higher than the SOC at the time of arrival at the charging base A, it is determined that the battery 20 was charged while the vehicle 1 stopped at the charging base A.

When it is determined in step S35 that the battery 20 was charged in the charging base A while the vehicle 1 stopped at the charging base A, the processing proceeds to step S36. In step S36, a counter Nr indicating the number of charges in the charging base A is incremented by one, and the processing proceeds to step S37. Meanwhile, when it is determined in step S35 that the battery 20 was not charged in the charging base A while the vehicle 1 stopped at the charging base A, then step S36 is skipped.

When it is determined in step S34 that the vehicle 1 has not yet departed from the charging base, that is, the vehicle 1 is at a stopped state at the charging base A, or the vehicle 1 is traveling outside the charging base A, then steps S35 and S36 are skipped.

In step S37, an external charging frequency Fr is calculated by dividing a value of the counter Nr indicating the number of charges calculated in step S36 by a value of the counter Na indicating the number of arrivals calculated in step S33 (Fr=Nr/Na). Therefore, in the present control routine, the ratio of the number of charges performed in the charging base A to the number of arrivals at the charging base A is calculated as the external charging frequency.

Modification of First Embodiment

Next, a modification of the first embodiment will be described with reference to FIG. 9. In the first embodiment, the external charging frequency is calculated regardless of the SOC at the time when the vehicle 1 arrived at a charging base. However, the SOC at the time when the vehicle 1 arrived at the charging base is high when, for example, the vehicle 1 travels for a short distance after the battery 20 is charged, and then returns to the charging base. Thus, when the SOC at the time of arrival at the charging base is high, the user does not feel the necessity of charging the battery 20 in the charging base. Therefore, in such a case, there is a high possibility that charging is not performed in the charging base.

Accordingly, in the present modification, the external charging frequency in the charging base is calculated in consideration of the SOC at the time when the vehicle 1 arrived at the charging base. Specifically, when the SOC at the time when the vehicle 1 arrived at the charging base is equal to or less than a charging required SOC, the external charging frequency is updated based on the presence and absence of charging. When the SOC at the time when the vehicle 1 arrived at the charging base is higher than the charging required SOC, the external charging frequency is not updated. Therefore, in the present modification, it can be said that the external charging frequency is the frequency of charging of the battery 20 with the external power source 70 performed while the vehicle 1 is stopped at a charging base and when the SOC at the time when the vehicle 1 arrived at the charging base is equal to or less than a predetermined charging required SOC.

In the present modification, the external charging frequency is updated in consideration of the SOC at the time when the vehicle 1 arrived at the charging base. However, the external charging frequency may be updated in consideration of other parameters. Examples of the other parameters may include a travel distance of the vehicle 1 until the vehicle 1 arrives at the charging base this time after the vehicle 1 departed from the charging base last time. In this case, for example, when the travel distance is short, the external charging frequency based on the presence and absence of charging in the charging base is not updated this time.

Figure 9:
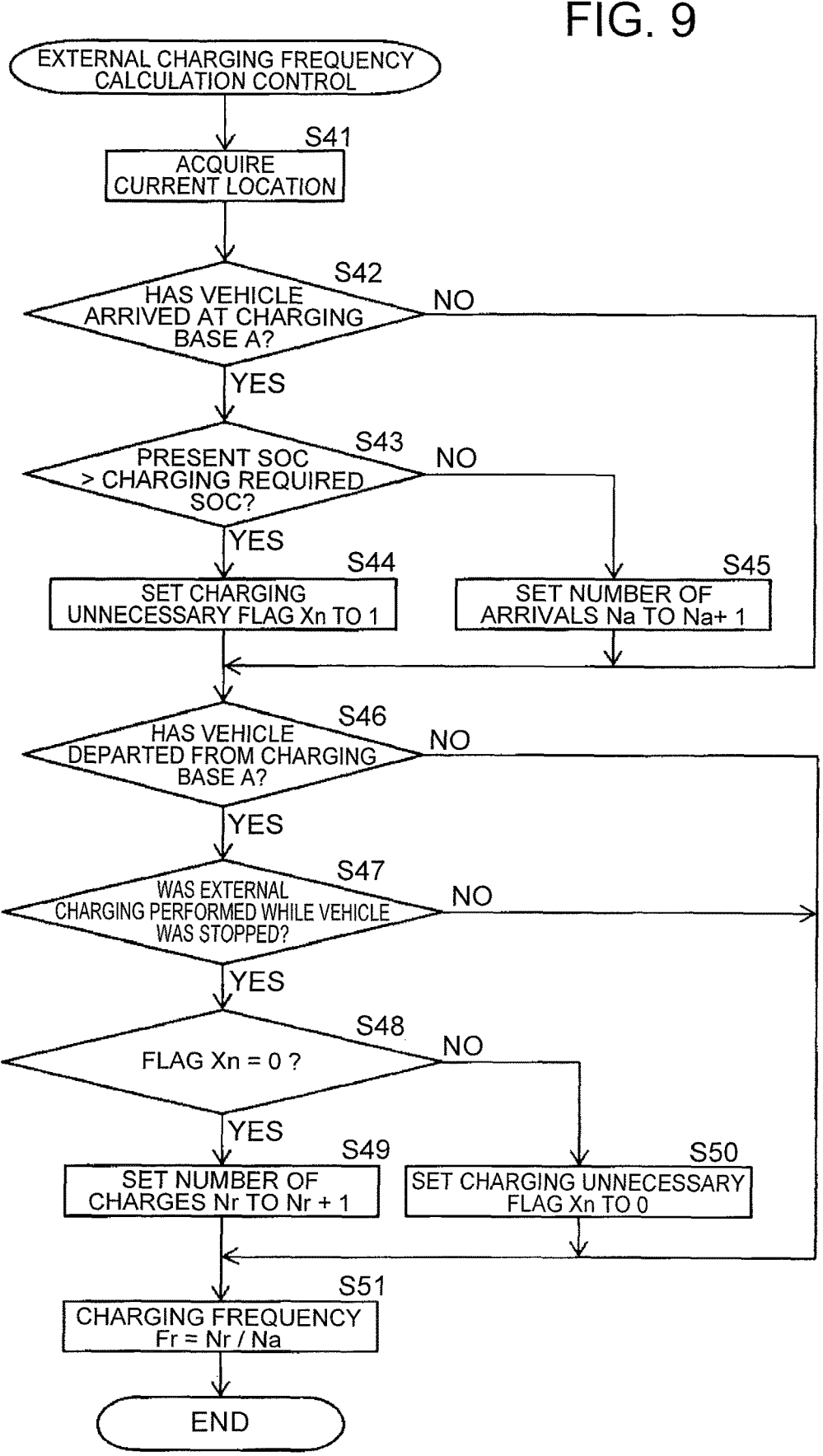
FIG. 9 is a flowchart illustrating a control routine of external charging frequency calculation control according to a modification of the first embodiment.

FIG. 9 is a flowchart illustrating a control routine of external charging frequency calculation control according to the present modification. The illustrated control routine is executed at constant time intervals. Since steps S41, S42, S46, and S47 in FIG. 9 are similar to steps S31, S32, S34, and S35 in FIG. 8, the description thereof is omitted.

When it is determined in step S42 that the vehicle 1 has just arrived at the charging base A, the processing proceeds to step S43. In step S43, it is determined whether or not the SOC at present time (that is, at the time when the vehicle 1 arrived at the charging base A) is equal to or greater than the predetermined charging required SOC. When it is determined in step S43 that the SOC at present time is equal to or greater than the charging required SOC, the processing proceeds to step S44. In step S44, a charging unnecessary flag Xn indicating that the SOC is not low enough to require charging is set to "1". When it is determined in step S43 that the SOC at present time is equal to or less than the charging required SOC, the processing proceeds to step S45. In step S45, the counter Na indicating the number of arrivals at the charging base A is incremented by one as in step S33 of FIG. 8. Therefore, in the present control routine, when the SOC at present time is higher than the charging required SOC, the counter indicating the number of arrivals is not updated.

In step S48, it is determined whether or not the charging unnecessary flag Xn is equal to "0". When it is determined in step S48 that the charging unnecessary flag Xn is equal to "0", the processing proceeds to step S49. In step S49, as in step S36 of FIG. 8, the counter Nr indicating the number of charges in the charging base A is incremented by one, and the processing proceeds to step S51. Meanwhile, when it is determined in step S49 that the charging unnecessary flag Xn is not equal to "0", the processing proceeds to step S50. In step S50, the charging unnecessary flag Xn is reset to "0", and the processing proceeds to step S51. Therefore, in the present control routine, when the SOC at present time is higher than the charging required SOC, the counter indicating the number of charges is not incremented either.

In step S51, the external charging frequency Fr is calculated as in step S37 of FIG. 8. Therefore, in the present control routine, it can be said the external charging frequency Fr represents the frequency of charging of the battery 20 with the external power source 70 performed while the vehicle 1 is stopped at the charging base A and when the SOC at the time when the vehicle 1 arrived at the charging base A is equal to or less than the charging required SOC.

Second Embodiment

Figure 10:
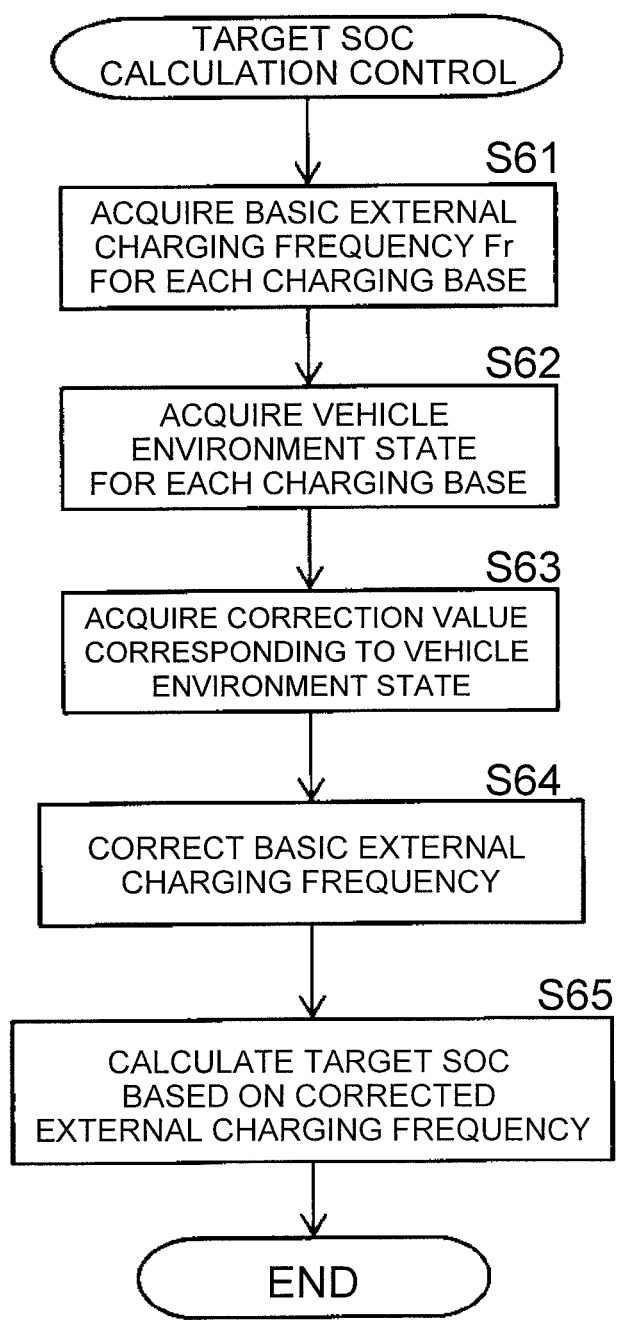
FIG. 10 is a flowchart illustrating a control routine of target SOC calculation control that calculates the target SOC in each charging base.
Figure 11:
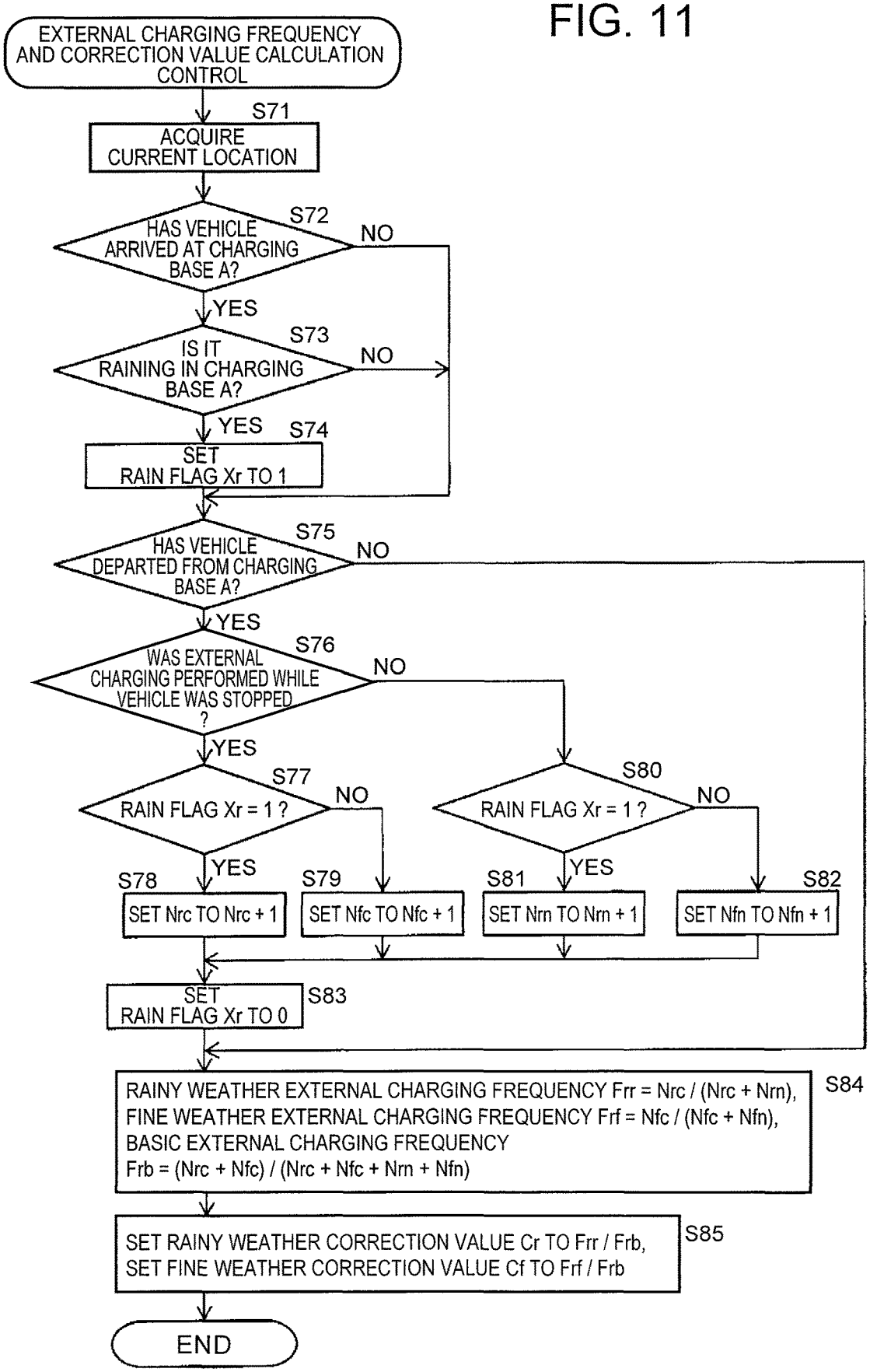
FIG. 11 is a flowchart illustrating a control routine of external charging frequency and correction value calculation control for calculating the external charging frequency in a certain charging base and calculating a correction value.

A description is now given of a hybrid vehicle according to a second embodiment with reference to FIGS. 10 and 11. The configuration and control of the hybrid vehicle 1 according to the second embodiment are basically similar to the configuration and control of the hybrid vehicle 1 according to the first embodiment. Accordingly, a difference from the hybrid vehicle according to the first embodiment will mainly be described below.

It can be considered that the charging possibility in each charging base changes due to various factors. For example, when the weather is fine, it is easy to connect the external connector 72 to the vehicle-side connector 22. However, when it is bad weather, such as rainy weather, it is troublesome to connect the external connector 72 to the vehicle-side connector 22. Accordingly, it may be considered that the charging possibility changes in accordance with the weather. It may also be considered that the charging possibility changes in accordance with a day of the week or a time slot. In addition, when a plurality of persons drives the vehicle 1, it may be considered that the charging possibility is different for each driver. Furthermore, when there are a large number of occupants including a child in the vehicle 1, it becomes difficult to connect the external connector 72 because the child needs to be attended after an occupant or occupants get out of the vehicle.

Accordingly, in the present embodiment, the target SOC is set in consideration of vehicle environment states (states of time and environment inside and outside the vehicle) including a time slot in the daytime, a day of the week, weather, a driver, and the number of occupants when the vehicle stopped at the charging base in the past. Accordingly, in the present embodiment, the charging history used for estimating the charging possibility in each charging base includes an external charging frequency for each of the vehicle environment states that are different from each other at least in one of the following categories: the time slot in the daytime, the day of the week, the weather, the driver, and the number of occupants. Therefore, in the present embodiment, the charging history includes the external charging frequency for each weather (such as fine weather, rainy weather, and snowy weather), for example. Alternatively, the charging history includes an external charging history for each different driver, for example.

In the present embodiment, the target SOC setting unit 43 acquires the vehicle environment state at present time or at the time when the vehicle is expected to arrive at each charging base. The vehicle environment state is acquired with various sensors and communication devices connected to the ECU 40.

For example, the time slot and the day of the week are acquired with the clock incorporated in the ECU 40. Alternatively, the time slot and the day of the week may be acquired by receiving date information and time information from an external server through the on-board communication device 53. The weather is acquired by receiving the weather information about the current location or the charging bases from an external server through the on-board communication device 53, for example. Alternatively, the weather information about the current location may be acquired based on an output signal of the rain sensor 57.

Current driver information (for example, information such as who is the current driver out of a plurality of drivers registered) is acquired based on a facial image photographed with the driver monitoring camera 54. Alternatively, the current driver information may be acquired based on key information acquired by the key sensor 55. In addition, the number of occupants is acquired based on the output of the weight sensor 56.

Furthermore, in the present embodiment, the target SOC is set lower when the acquired vehicle environment state is a vehicle environment state relatively high in external charging frequency than when the acquired vehicle environment state is a vehicle environment state relatively low in external charging frequency.

For example, consider the case where the external charging frequency in a certain charging base is higher when the weather is fine at the time when the vehicle 1 arrived at the charging base than when the weather is rainy. In this case, the target SOC setting unit 43 acquires the weather at present time or at the time when the vehicle is expected to arrive at the charging base based on the weather information received from an external server through the on-board communication device 53. The target SOC is set lower when the acquired weather is fine (the vehicle environment state relatively high in external charging frequency) than when the acquired wither is rainy (the vehicle environment state relatively low in external charging frequency).

Consider the case where, for example, the external charging frequency in a certain charging base is higher when the driver driving at the time when the vehicle 1 arrived at the charging base is a driver S than when the driver is a driver T. In this case, the SOC setting unit 43 acquires the driver at present time or at the time when the vehicle is expected to arrive at the charging base, based on the output of the driver monitoring camera 54 or the like. Then, the target SOC is set lower when the acquired driver is the driver S (the vehicle environment state relatively high in external charging frequency) than when the acquired driver is the driver T (the vehicle environment state relatively low in external charging frequency).

In addition, consider the case where the external charging frequency in a certain charging base is higher when the time slot in which the vehicle 1 arrived at the charging base is a specific time slot (for example, 17:00 to 18:00) than when the time slot is any other time slots. In this case, the SOC setting unit 43 acquires a current time slot or the time slot in which the vehicle is expected to arrive at the charging base, based on the clock incorporated in the ECU 40. Then, the target SOC is set lower when the acquired time slot is the specific time slot (the vehicle environment state relatively high in external charging frequency) than when the acquired time slot is any other time slots (the vehicle environment state relatively low in external charging frequency).

Furthermore, consider the case where the external charging frequency in a certain charging base is higher when the day of the week in which the vehicle 1 arrived at the charging base is a specific day of the week (for example, Sunday) than when the day of week is any other days. In this case, the SOC setting unit 43 acquires the current day of the week based on the clock incorporated in the ECU 40. Then, the target SOC is set lower when the acquired day of week is the specific day of the week (the vehicle environment state relatively high in external charging frequency) than when the acquired days of week is any other days (the vehicle environment state relatively low in external charging frequency).

Alternatively, consider the case where the external charging frequency in a certain charging base is higher when the number of occupants at the time when the vehicle 1 arrived at the charging base is a specific number (for example, one) than when the number of occupants is any other number. In this case, the SOC setting unit 43 acquires the number of occupants calculated based on the output of the weight sensor 56. Then, the target SOC is set lower when the acquired number of occupants is the specific number (the vehicle environment state relatively high in external charging frequency) than when the acquired number of occupants is any other number (the vehicle environment state relatively low in external charging frequency).

According to the present embodiment, the target SOC is changed in accordance with the vehicle environment state in this way. As a result, the target SOC can appropriately be set in accordance with the charging possibility in each charging base.

Flowchart

FIG. 10 is a flowchart illustrating a control routine of target SOC calculation control that calculates the target SOC in each charging base. The illustrated control routine is executed at constant time intervals or whenever external charging frequency in each charging base is updated.

First, in step S61, a basic external charging frequency Frb for each charging base is acquired. For example, the basic charging frequency is calculated for each charging base by external charging frequency and correction value calculation control described later with reference to FIG. 11. The calculated basic charging frequency is stored in the memory of the ECU 40.

Next, in step S62, the vehicle environment state when the vehicle 1 arrives at the charging base is acquired based on the output of various sensors and communication devices for each charging base. Specifically, the weather at the time when the vehicle 1 arrives at the charging base is acquired, for example.

Next, in step S63, a correction value of the external charging frequency corresponding to the vehicle environment state acquired in step S62 is acquired. Specifically, a correction value at the time when the weather is fine, or a correction value at the time when the weather is rainy are acquired, for example. For example, the correction value for each vehicle environment state is calculated for each charging base by external charging frequency and correction value calculation control described later with reference to FIG. 11. The calculated correction value is stored in the memory of the ECU 40

Next, in step S64, the external charging frequency in each charging base is calculated by correcting the basic external charging frequency acquired in step S61 with use of the correction value of the external charging frequency acquired in step S63. Specifically, the basic external charging frequency is corrected by multiplying the basic external charging frequency by the correction value or adding the correction value to the basic external charging frequency, for example.

Next, in step S65, the target SOC for each charging base is calculated with, for example, a map as illustrated in FIG. 6, based on the external charging frequency for each charging base calculated in step S64. Then, the control routine is ended.

FIG. 11 is a flowchart illustrating a control routine of the external charging frequency and correction value calculation control for calculating the external charging frequency in a certain charging base (charging base A) and calculating the correction value. The illustrated control routine is executed at constant time intervals.

As illustrated in FIG. 11, first in step S71, a current location is acquired. Next, in step S72, it is determined whether or not the vehicle 1 has just arrived at the charging base A. In step S73, it is determined whether or not it is raining in the charging base A. When it is determined in steps S72 and S73 that the vehicle 1 has just arrived at the charging base A, and the weather is rainy in the charging base A, the processing proceeds to step S74. Otherwise, step S74 is skipped. In step S74, a rain flag Xr is set to "1", and the processing proceeds to step S75.

In step S75, it is determined whether or not the vehicle 1 has just departed from the charging base A. When it is determined that the vehicle 1 has not departed from the charging base A, steps S76 to S83 are skipped. When it is determined in step S75 that the vehicle 1 has just departed from the charging base A, the processing proceeds to step S76.

In step S76, it is determined whether or not the battery 20 was charged with the external power source 70 while the vehicle 1 was stopped at the charging base A before departure from the charging base A. When it is determined that the battery 20 was charged while the vehicle 1 was stopped at the charging base A, the processing proceeds to step S77. In step S77, it is determined whether or not the rain flag Xr is equal to "1", that is, whether or not the weather was rainy at the time of arrival at the charging base A. When it is determined that the rain flag Xr is equal to "1", the processing proceeds to step S78, and a counter Nrc indicating the number of charges performed in the rainy weather (number of charges in rainy weather) is incremented by one. Meanwhile, when it is determined in step S77 that the rain flag Xr is not equal to "1", the processing proceeds to step S79. In step S79, a counter Nfc indicating the number of charges performed in fine weather (number of charges in fine weather) is incremented by one.

Meanwhile, when it is determined in step S76 that the battery 20 was not charged while the vehicle 1 stopped at the charging base A, then the processing proceeds to step S80. In step S80, it is determined whether or not the rain flag Xr is equal to "1". When it is determined that the rain flag Xr is equal to "1", the processing proceeds to step S81, and a counter Nrn indicating the number of charges not performed in the rainy weather (number of non-charges in rainy weather) is incremented by one. Meanwhile, when it is determined in step S80 that the rain flag Xr is not equal to "1", the processing proceeds to step S82. In step S82, a counter Nfn indicating the number of charges not performed in fine weather (number of non-charges in fine weather) is incremented by one.

The rain flag Xr is reset to "0" in step S83. Next, in step S84, an external charging frequency (rainy weather external charging frequency) Frr in the case of rainy weather at the time of arrival at the charging base A is calculated by Expression (1). An external charging frequency (fine weather external charging frequency) Frf in the case of not rainy weather at the time of arrival at the charging base A is calculated by Expression (2). In addition, an external charging frequency (basic external charging frequency) Frb in the charging base A unrelated to the weather is calculated by Expression (3). The basic external charging frequency Frb is used in step S61 of FIG. 10.

$$Frr=Nrc/(Nrc+Nrn) \tag{1}$$

$$Frf=Nfc/(Nfc+Nfn) \tag{2}$$

$$Frb=(Nrc+Nfc)/(Nrc+Nrn+Nfc+Nfn) \tag{3}$$

Next, in step S84, a correction value in the case of rainy weather (rainy weather correction value) Cr and a correction value in the case of fine weather (fine weather correction value) Cf are calculated based on Expressions (4) and (5). The correction values Cr, Cf are used in step S64 of FIG. 10.

$$Cr=Frr/Frb \tag{4}$$

$$Cf=Frf/Frb \tag{5}$$

In the examples illustrated in FIGS. 10 and 11, the target SOC is changed in accordance with changes in the vehicle environment state based on the weather. However, the target SOC calculation control, as well as the external charging frequency and the correction value calculation control can be performed in the same manner as in the examples illustrated in FIGS. 10 and 11 in accordance with changes in the vehicle environment state based on parameters other than the weather.

Modification of Second Embodiment

Next, a modification of the second embodiment will be described with reference to FIGS. 12 to 14. In the vehicle 1 according to the present modification, in the situation where the charging possibility at the charging base is lower than a certain level, the target SOC is uniformly set to a relatively large value. This makes it possible to more reliably reduce the possibility that the output restriction of the motor generators 12, 14 is needed when the vehicle 1 departs from the charging base again.

Figure 12:
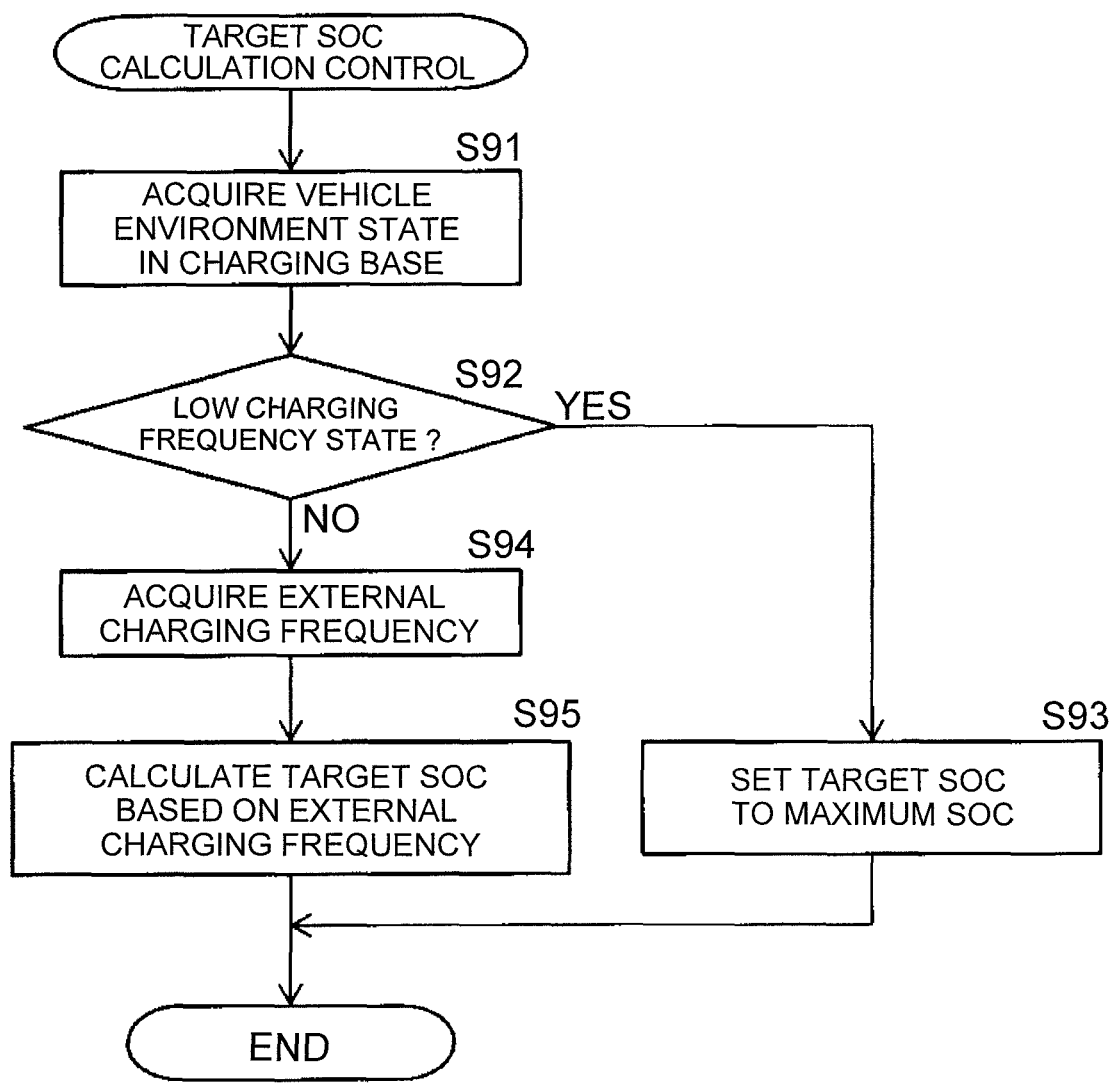
FIG. 12 is a flowchart illustrating a control routine for the target SOC calculation control that calculates the target SOC in the charging base.

FIG. 12 is a flowchart illustrating a control routine of target SOC calculation control that calculates the target SOC in the charging base. The illustrated control routine is executed at constant time intervals or whenever the external charging frequency in each charging base is updated. The illustrated control routine is executed for each charging base.

First, in step S91, the vehicle environment state of a charging base when the vehicle 1 arrives at the charging base is acquired based on the output of various sensors and communication devices. Next, in step S92, it is determined whether or not the vehicle environment state acquired in step S91 is a low charging frequency state. The low charging frequency state is set with reference to FIGS. 13 and 14 in external charging frequency calculation control described later. For example, when the case of the rainy weather or the like is registered as the low charging frequency state, and the weather acquired in step S91 is rainy weather, it is determined that the current weather corresponds to the low charging frequency state.

In step S92, when it is determined that the vehicle environment state is the low charging frequency state, the processing proceeds to step S93. In step S93, the target SOC is set to a maximum SOC, and the control routine is ended. Here, the maximum SOC is a value larger than a maximum value of the target SOC calculated in step S95.

When it is determined in step S92 that the vehicle environment state is not the low charging frequency state, the processing proceeds to step S94. In step S94, an external charging frequency is acquired. For example, the external charging frequency is calculated with reference to FIGS. 13 and 14 in external charging frequency calculation control described later.

Next, in step S95, the target SOC for each charging base is calculated with, for example, a map as illustrated in FIG. 6 based on the external charging frequency for each charging base acquired in step S94. Then, the control routine is ended.

Figure 13:
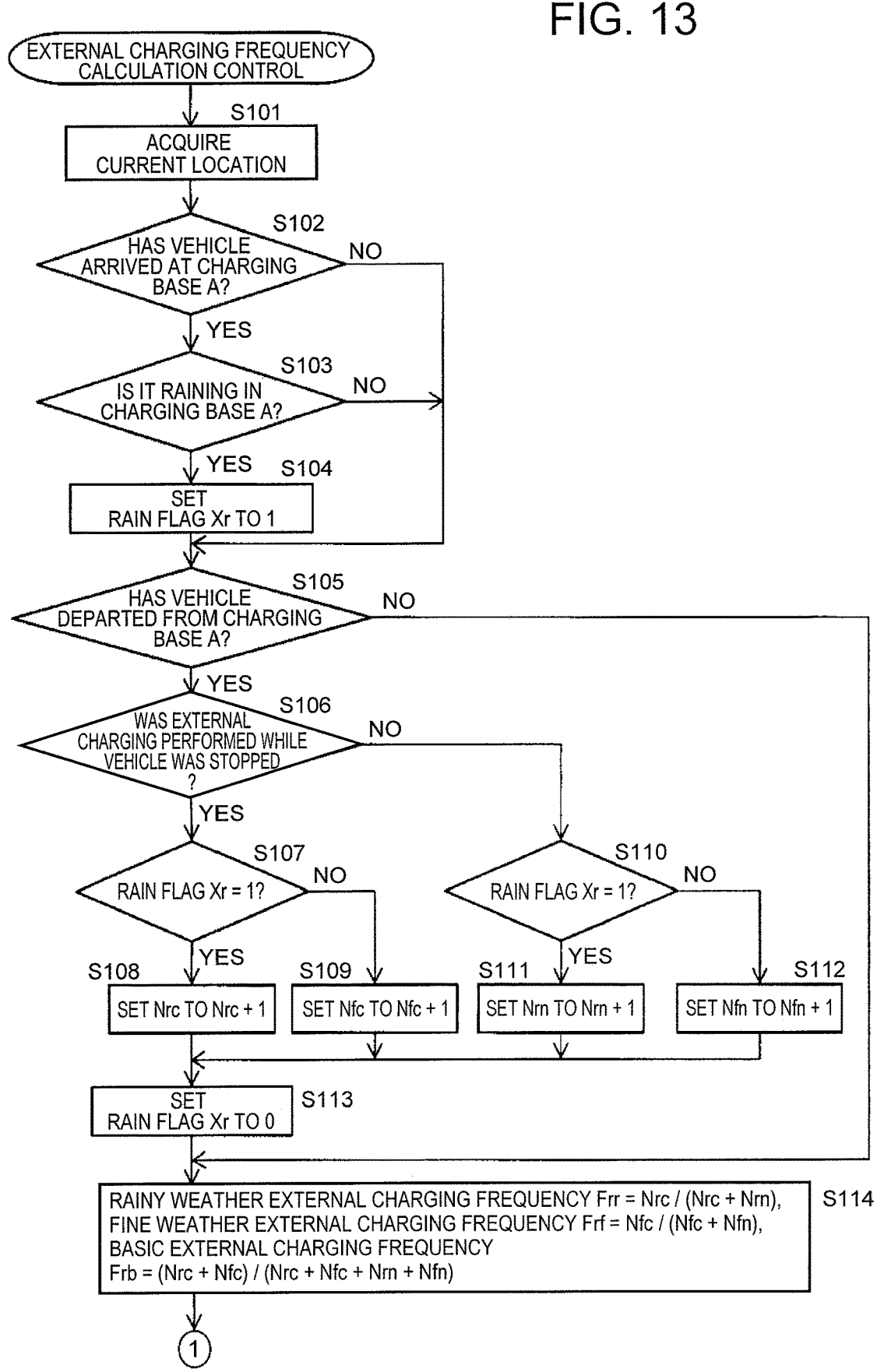
FIG. 13 is a fragmentary flowchart illustrating a control routine for the external charging frequency calculation control that calculates the external charging frequency in a certain charging base.
Figure 14:
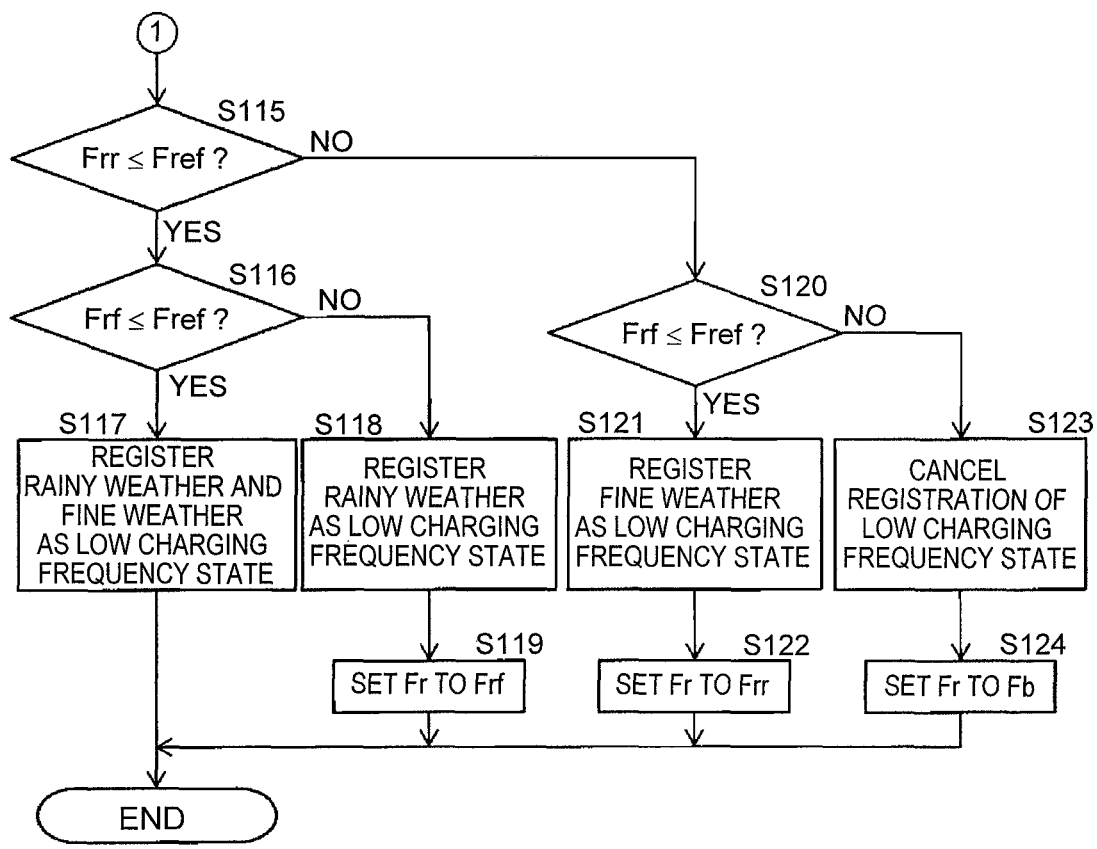
FIG. 14 is a fragmentary flowchart illustrating a control routine for the external charging frequency calculation control that calculates the external charging frequency in a certain charging base.

FIGS. 13 and 14 are flowcharts illustrating a control routine of external charging frequency calculation control for calculating the external charging frequency in a certain charging base (charging base A). The illustrated control routine is executed at constant time intervals. Since steps S101 to S114 of FIG. 13 are similar to steps S71 to S84 of FIG. 11, description thereof is omitted.

In step S115, it is determined whether or not the rainy weather external charging frequency Frr calculated in step S114 is equal to or less than a predetermined reference frequency Fref (for example, 50%). When it is determined that the rainy weather external charging frequency Frr is equal to or less than the reference frequency, the processing proceeds to step S116. In step S116, it is determined whether or not the fine weather external charging frequency Frf calculated in step S114 is equal to or less than the predetermined reference frequency Fref. When it is determined in step S116 that the fine weather external charging frequency Frf is equal to or less than the reference frequency Fref, the processing proceeds to step S117. In step S117, both the rainy weather and the fine weather are registered as a low charging frequency state, and the control routine is ended.

When it is determined in step S116 that the fine weather external charging frequency Frf is higher than the reference frequency Fref, the processing proceeds to step S118. In step S118, the rainy weather is registered as the low charging frequency state. Next, in step S119, the fine weather external charging frequency Frf is set as the external charging frequency Fr in the charging base, and the control routine is ended.

When it is determined in step S115 that the rainy weather external charging frequency Frr is higher than the predetermined reference frequency Fref, the processing proceeds to step S120. In step S120, it is determined whether or not the fine weather external charging frequency. Frf is equal to or less than the predetermined reference frequency Fref. In step S120, when it is determined that the fine weather external charging frequency Frf is equal to or less than the reference frequency Fref, the processing proceeds to step S121. In step S121, the fine weather is registered as the low charging frequency state. Next in step S122, the rainy weather external charging frequency Frr is set as the external charging frequency Fr in the charging base, and the control routine is ended.

When it is determined in step S120 that the fine weather external charging frequency Frf is higher than the reference frequency Fref, the processing proceeds to step S123. In step S123, registration of the rainy weather and the fine weather as the low charging frequency state is cancelled. Next in step S124, a basic external charging frequency Fb is set as the external charging frequency Fr in the charging base, and the control routine is ended.

Third Embodiment

A description is now given of a hybrid vehicle according to a third embodiment. The configuration and control of the hybrid vehicle 1 according to the third embodiment are basically similar to the configuration and control of the hybrid vehicle 1 according to the first embodiment and the second embodiment. Accordingly, a difference from the hybrid vehicle according to the first embodiment and the second embodiment will mainly be described below.

In the embodiment, the charging possibility is estimated based on the charging history in each charging base. However, it is generally expected that the charging possibility in the rainy weather is lower than the charging possibility in the fine weather. Accordingly, in the present embodiment, the charging possibility is estimated based on the weather in the current location or each charging base at present time or at the time when the vehicle 1 is expected to arrive at each charging base, regardless of the charging history in each charging base.

Specifically, the target SOC setting unit acquires the weather in the charging base at present time, and sets the target SOC based on the acquired weather, for example. In this case, the target SOC is set higher in the order of fine weather, rainy weather, and snowy weather, for example.

In the present embodiment, the target SOC setting unit 43 sets the target SOC based on the weather. However, the target SOC setting unit 43 calculates a correction value based on the weather, and may correct, based on the correction value, the target SOC calculated based on the methods in the first embodiment and the second embodiment.

Figure 15:
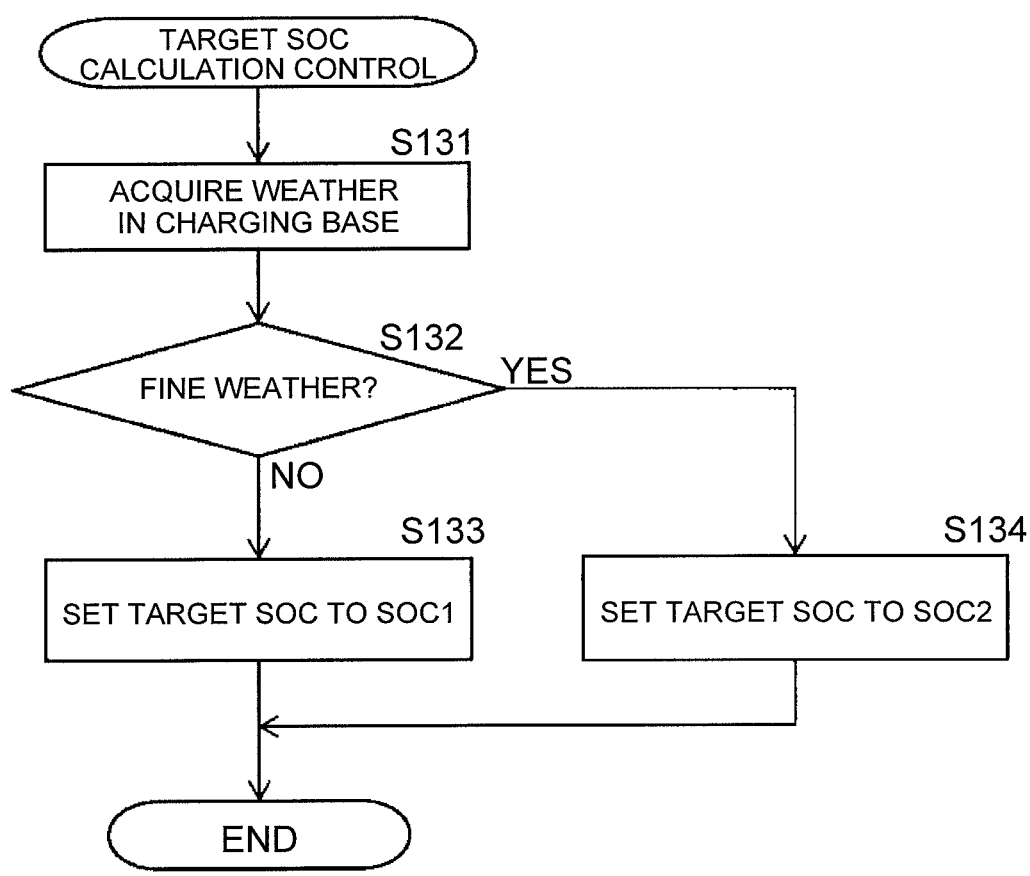
FIG. 15 is a flowchart illustrating a control routine for the target SOC calculation control that calculates the target SOC in the charging base.

FIG. 15 is a flowchart illustrating a control routine of target SOC calculation control in the present embodiment. The illustrated control routine is executed at constant time intervals or whenever external charging frequency in each charging base is updated. The illustrated control routine is executed for each charging base.

First in step S131, the weather in the charging base is acquired. Next, in step S132, it is determined whether or not the weather acquired in step S131 is fine weather. When it is determined that the weather is fine weather, the processing proceeds to step S133. In step S133, the target SOC is set to SOC1, and the control routine is ended. Meanwhile, when it is determined in step S132 that the weather is not fine weather, the processing proceeds to step S134. In step S134, the target SOC is set to SOC2 (a value higher than SOC1), and the control routine is ended.

Fourth Embodiment

Figure 16:
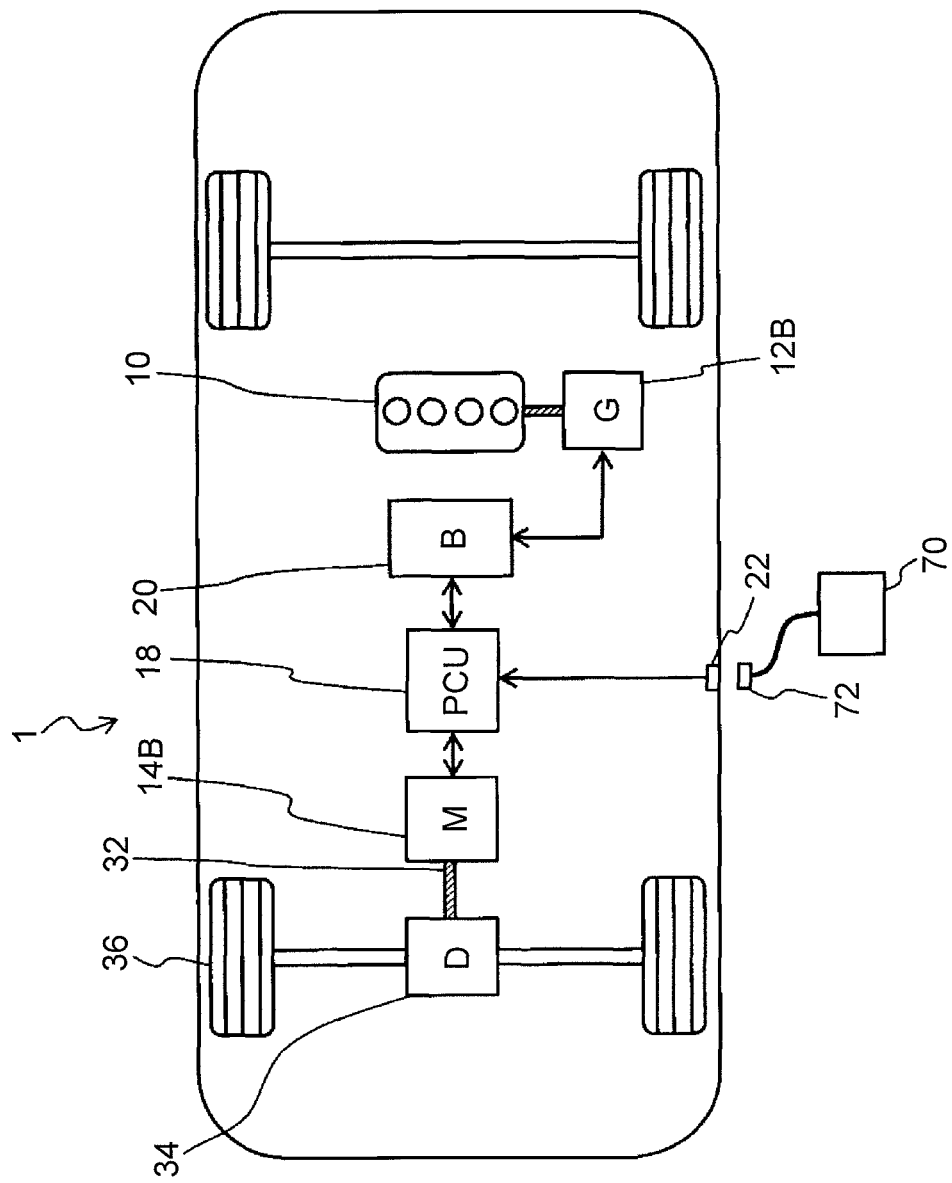
FIG. 16 schematically illustrates a hybrid vehicle according to a fourth embodiment.

A description is now given of a hybrid vehicle 1 according to a fourth embodiment with reference to FIG. 16. The configuration and control of the hybrid vehicle 1 according to the fourth embodiment are basically similar to the configuration and control of the hybrid vehicle 1 according to the first embodiment to the third embodiment. Accordingly, a difference from the hybrid vehicle according to the first embodiment to the third embodiment will mainly be described below.

As illustrated in FIG. 16, the vehicle 1 in the present embodiment includes the internal combustion engine 10, an electric generator 12B, the battery 20, the PCU 18, an electric motor 14B, and the vehicle-side connector 22. In the vehicle 1 of the present embodiment, the internal combustion engine 10 is mechanically coupled with the electric generator 12B without being coupled with the driving shaft 32. Therefore, the vehicle 1 is also configured such that the electric power generated with the output of the internal combustion engine 10 can be used to charge the battery 20. Particularly, the motive power of the internal combustion engine 10 is mainly used for charging the battery 20. The battery 20 is electrically connected to the electric motor 14B through the PCU 18. The electric motor 14B is driven with the electric power supplied from the battery 20. In addition, the vehicle 1 in the present embodiment is also configured such that the battery can be charged with the external power source 70 through the vehicle-side connector 22.

In the thus-configured vehicle 1, the target SOC is set, and eventually the switching SOC is also set by the methods disclosed in the first embodiment to the third embodiment.

In the above description, the hybrid vehicle configured as illustrated in FIG. 1 and the hybrid vehicle configured as illustrated in FIG. 16 are used as the hybrid vehicle 1. However, without being limited to the hybrid vehicles configured in this way, the hybrid vehicle 1 may be a hybrid vehicle configured in other ways.

What is claimed is:

1. A control device for a hybrid vehicle, the hybrid vehicle including an internal combustion engine, an electric motor, and a battery connected to the electric motor, the hybrid vehicle being configured to charge the battery with electric power generated with output of the internal combustion engine, the hybrid vehicle being configured to drive the electric motor with the electric power supplied from the battery, the hybrid vehicle being configured to charge the battery with an external power source, the control device comprising an electronic control unit, the electronic control unit being configured to:
   i) set a target charging rate, the target charging rate being a target value of a state of charge of the battery when the hybrid vehicle arrives at a prescribed charging base;
   ii) when the hybrid vehicle is traveling outside the charging base, control output of the internal combustion engine and the electric motor such that the state of charge at a time when the hybrid vehicle arrives at the charging base is the target charging rate; and
   iii) estimate a charging possibility and set the target charging rate lower when the estimated charging possibility is high than when the estimated charging possibility is low, the charging possibility being a possibility that the battery is charged with an external power source in the charging base when the hybrid vehicle arrives at the charging base.

2. The control device according to claim 1, wherein the charging possibility is estimated based on a charging history which is a history of charging the battery with the external power source when the hybrid vehicle stopped at the charging base in the past.

3. The control device according to claim 2, wherein:
   the charging history includes an external charging frequency that is a frequency of charging the battery with the external power source when the hybrid vehicle stopped at the charging base in the past; and the electronic control unit is configured to set the target charging rate lower when the external charging frequency is high than when the external charging frequency is low.

4. The control device according to claim 3, wherein the external charging frequency is a frequency of charging the battery with the external power source while the hybrid vehicle stopped in the base when the state of charge at a time when the hybrid vehicle arrives at the charging base is equal to or less than a predetermined value.

5. The control device according to claim 3, wherein:

the charging history includes an external charging frequency in each of a plurality of vehicle environment states when the hybrid vehicle stopped in the charging base in the past; and the electronic control unit is configured to:

i) acquire a vehicle environment state being a vehicle environment state at a present time or a vehicle environment state at a time when the hybrid vehicle is expected to arrive at the charging base; and ii) set the target charging rate lower when the acquired vehicle environment state is a vehicle environment state in which the external charging frequency is high than when the acquired vehicle environment state is a vehicle environment state in which the external charging frequency is low.

6. The control device according to claim 5, wherein the vehicle environment states are different at least in one of following categories: (i) a time slot, (ii) a day of the week, (iii) weather, (iv) a driver, and (v) number of occupants.

7. The control device according to claim 1, wherein the charging possibility is estimated based on weather in a current location or in the charging base, the weather being weather at a present time or weather at a time when the hybrid vehicle is expected to arrive at the charging base.

* * * * *